United States Patent
Yokoi et al.

(10) Patent No.: US 10,846,441 B2
(45) Date of Patent: Nov. 24, 2020

(54) COMPUTER SYSTEM

(71) Applicant: Hitachi, Ltd., Tokyo (JP)

(72) Inventors: Nobuhiro Yokoi, Tokyo (JP); Mutsumi Hosoya, Tokyo (JP); Ken Sugimoto, Tokyo (JP)

(73) Assignee: HITACHI, LTD., Tokyo (JP)

( * ) Notice: Subject to any disclaimer, the term of this patent is extended or adjusted under 35 U.S.C. 154(b) by 62 days.

(21) Appl. No.: 16/082,259

(22) PCT Filed: Jul. 7, 2016

(86) PCT No.: PCT/JP2016/070128
§ 371 (c)(1),
(2) Date: Sep. 4, 2018

(87) PCT Pub. No.: WO2018/008123
PCT Pub. Date: Jan. 11, 2018

(65) Prior Publication Data
US 2019/0095651 A1  Mar. 28, 2019

(51) Int. Cl.
*G06F 21/79* (2013.01)
*G06F 21/60* (2013.01)
(Continued)

(52) U.S. Cl.
CPC .............. *G06F 21/79* (2013.01); *G06F 3/061* (2013.01); *G06F 3/0604* (2013.01); *G06F 3/0623* (2013.01); *G06F 3/0644* (2013.01); *G06F 3/0647* (2013.01); *G06F 3/0661* (2013.01); *G06F 3/0685* (2013.01); *G06F 3/0688* (2013.01); *G06F 21/602* (2013.01); *G06F 21/604* (2013.01); *H04L 9/0894* (2013.01); *G06F 2221/2107* (2013.01)

(58) Field of Classification Search
CPC ........ G06F 21/79; G06F 3/0604; G06F 3/061; G06F 3/0623; G06F 3/0644; G06F 3/0647; G06F 3/0661; G06F 3/0685; G06F 3/0688; G06F 21/602; G06F 21/604; G06F 2221/2107; H04L 9/0894
See application file for complete search history.

(56) References Cited

U.S. PATENT DOCUMENTS 7,353,541 B1 *  4/2008  Ishibashi ............... G06F 21/10
                                              348/E7.056
9,665,303 B1 *  5/2017  Huff ....................... G06F 3/064
(Continued)

FOREIGN PATENT DOCUMENTS

JP  2010-257045 A  11/2010

*Primary Examiner* — Ali S Abyaneh
*Assistant Examiner* — Zoha Piyadehghibi Tafaghodi
(74) *Attorney, Agent, or Firm* — Procopio, Cory, Hargreaves & Savitch LLP

(57) ABSTRACT

A computer system includes a processor, a volatile storage device that stores a program to be executed by the processor, and a plurality of nonvolatile storage devices that store data. Each of the plurality of nonvolatile storage devices holds a first encryption key for encrypting and decrypting first data. Each nonvolatile storage device in the plurality of nonvolatile storage devices transfers the first data to another nonvolatile storage device in the plurality of nonvolatile storage devices in an encrypted or unencrypted state determined according to a predetermined rule.

8 Claims, 21 Drawing Sheets

(51) Int. Cl.
*G06F 3/06* (2006.01)
*H04L 9/08* (2006.01)

(56) References Cited

U.S. PATENT DOCUMENTS

| | | | |
|---|---|---|---|
| 2004/0181811 A1* | 9/2004 | Rakib | H04N 21/643 |
| | | | 725/122 |
| 2009/0268903 A1* | 10/2009 | Bojinov | G06F 3/0622 |
| | | | 380/45 |
| 2009/0319772 A1* | 12/2009 | Singh | G06F 21/6218 |
| | | | 713/153 |
| 2010/0275264 A1 | 10/2010 | Masuyama | |
| 2014/0089657 A1* | 3/2014 | Eguchi | H04L 63/0428 |
| | | | 713/150 |
| 2015/0067349 A1 | 3/2015 | Werner et al. | |
| 2015/0095648 A1* | 4/2015 | Nix | H04L 9/3239 |
| | | | 713/170 |

* cited by examiner

FIG. 2
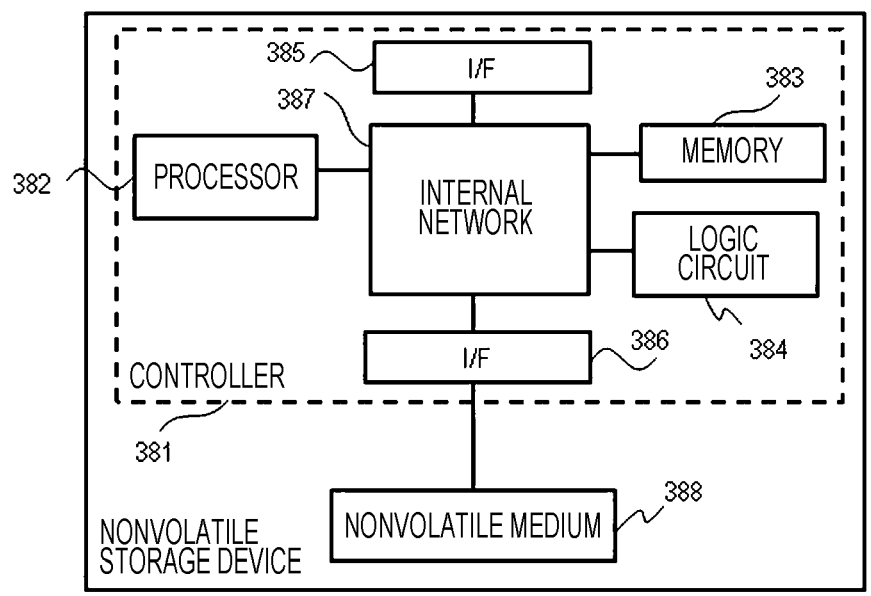
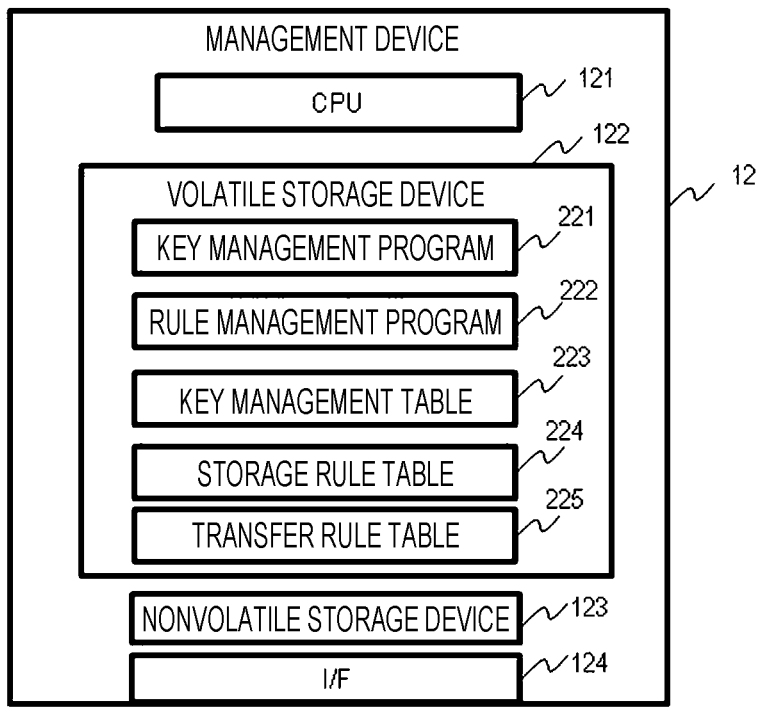
FIG. 3

| | 231 | 232 | 233 | 234 |
|---|---|---|---|---|
| | DEVICE | VOL | ADDRESS RANGE | KEY |
| | SERVER-MOUNTED FIRST NONVOLATILE STORAGE DEVICE | VOL_1 | 0x1000 TO 0x3FFF | Key_A |
| | | | 0x4000 TO 0x9FFF | Key_B |
| | SERVER-MOUNTED SECOND NONVOLATILE STORAGE DEVICE | VOL_1 | 0x1000 TO 0x3FFF | Key_A |
| | | | 0x4000 TO 0x9FFF | Key_B |
| | ... | | ... | ... |

KEY MANAGEMENT TABLE 223

FIG. 10

| 241 | 242 | 243 | 244 | 245 |
|---|---|---|---|---|
| DEVICE | VOL | ADDRESS RANGE | ENCRYPTION | COMPRESSION |
| SERVER-MOUNTED FIRST NONVOLATILE STORAGE DEVICE | VOL_1 | 0x1000 TO 0x9FFF | ON | OFF |
| SERVER-MOUNTED SECOND NONVOLATILE STORAGE DEVICE | VOL_1 | 0x1000 TO 0x3FFF | ON | OFF |
| | | 0x4000 TO 0x9FFF | ON | ON |
| ... | | ... | ... | ... |

STORAGE RULE TABLE 224

FIG. 11

| TRANSMISSION SOURCE | VOL | ADDRESS RANGE | TRANSMISSION DESTINATION | VOL | ADDRESS RANGE | ENCRYPTION | COMPRESSION |
|---|---|---|---|---|---|---|---|
| SERVER-MOUNTED FIRST NONVOLATILE STORAGE DEVICE | VOL_1 | 0x0000 TO 0x9FFF | VOLATILE STORAGE DEVICE | VOL_1 | — | OFF | OFF |
| | | | SERVER-MOUNTED SECOND NONVOLATILE STORAGE DEVICE | VOL_1 | 0x0000 TO 0x3FFF | ON | OFF |
| | | | | VOL_1 | 0x4000 TO 0x9FFF | ON | OFF |
| | | | STORAGE SYSTEM | VOL_1 | — | ON | OFF |
| | | | ... | ... | ... | ... | ... |
| SERVER-MOUNTED SECOND NONVOLATILE STORAGE DEVICE | VOL_1 | 0x0000 TO 0x3FFF | VOLATILE STORAGE DEVICE | VOL_1 | — | OFF | OFF |
| | | | SERVER-MOUNTED FIRST NONVOLATILE STORAGE DEVICE | VOL_1 | 0x0000 TO 0x3FFF | ON | OFF |
| | | | | VOL_1 | 0x4000 TO 0x9FFF | ON | OFF |
| | | | STORAGE SYSTEM | VOL_1 | — | OFF | OFF |
| | | | ... | ... | ... | ... | ... |
| | VOL_1 | 0x4000 TO 0x9FFF | VOLATILE STORAGE DEVICE | VOL_1 | — | OFF | OFF |
| | | | SERVER-MOUNTED FIRST NONVOLATILE STORAGE DEVICE | VOL_1 | 0x0000 TO 0x9FFF | ON | OFF |
| | | | STORAGE SYSTEM | VOL_1 | — | ON | OFF |
| | | | ... | ... | ... | ... | ... |
| ... | ... | ... | ... | ... | ... | ... | ... |

TRANSFER RULE TABLE 225

FIG. 12

FIG. 17
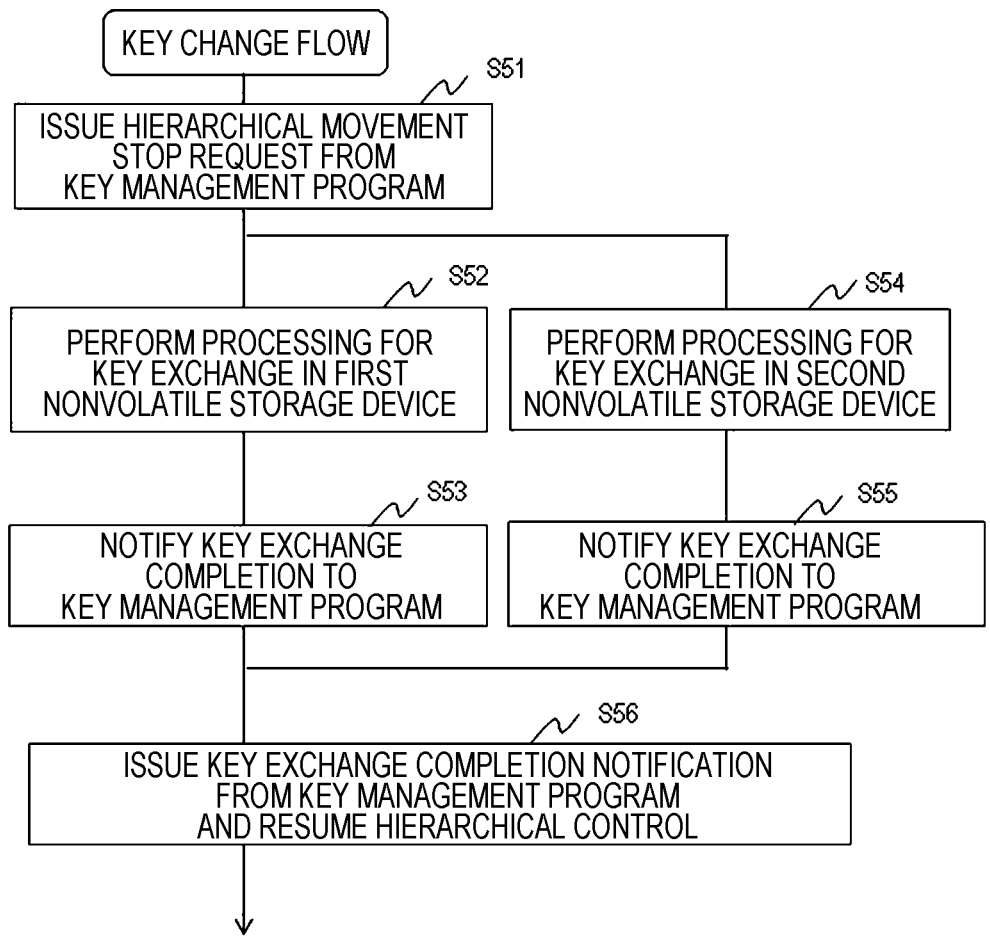
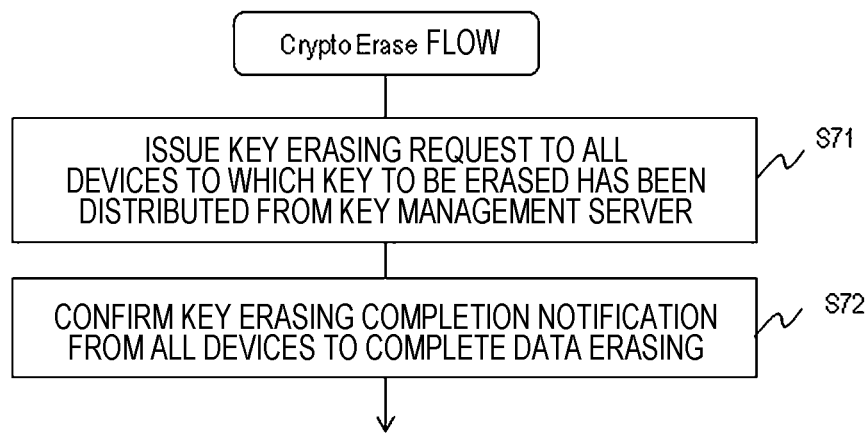
FIG. 18

COMPUTER SYSTEM

TECHNICAL FIELD

The present invention relates to data transfer with encryption processing in a computer system.

BACKGROUND ART

In recent years, attempts to mount a high-speed nonvolatile memory device (hereinafter referred to as high-speed memory device) in addition to a volatile memory device such as a DRAM on a server are in progress. This achieves improvement of performance of an application, using low latency of the device. For example, the server uses an external storage system and uses the high-speed memory device as a cache to the storage system or a higher tier area in a storage hierarchical system.

Examples of the high-speed memory include storage class memories (SCMs) such as a magnetoresistive random access memory (MRAM) and a phase change memory (PCM) besides a flash memory.

However, since the nonvolatile memory device keeps retaining information even when a power supply is turned off, there are risks such as leakage of the information due to removal of the device and leakage of the information at the disposal of the broken device. Therefore, encryption of data to be stored in the nonvolatile memory is necessary.

For example, encryption processing by a storage device within an apparatus is disclosed in US Patent Application Publication No. 2015/0067349. The apparatus includes the storage device and a host device. The storage device is configured to encrypt and decrypt user data during write and read operations. The host device is communicatively coupled to the storage device. The host device is configured to execute the write and read operations by concentrating a first number of virtual bands into a second number of real bands, in which the second number is smaller than the first number (see Abstract).

CITATION LIST

Patent Literature

PTL 1: US Patent Application Publication No. 2015/0067349

SUMMARY OF INVENTION

Technical Problem

However, in a configuration in which nonvolatile storage devices such as a server SCM device and an external storage system in a system independently perform encryption processing, data transfer between the nonvolatile storage devices requires repetition of encryption and decryption of data. Therefore, an encryption processing load in the system becomes large.

Solution to Problem

In one example, a computer system includes a processor, a volatile storage device that stores a program to be executed by the processor, and a plurality of nonvolatile storage devices that store data. Each of the plurality of nonvolatile storage devices holds a first encryption key for encrypting and decrypting first data. Each nonvolatile storage device in the plurality of nonvolatile storage devices transfers the first data to another nonvolatile storage device in the plurality of nonvolatile storage devices in an encrypted or unencrypted state determined according to a predetermined rule.

Advantageous Effects of Invention

According to an embodiment of the present invention, data transfer with encryption processing can be made efficient in a system including a plurality of nonvolatile storage devices. Problems, configurations, and effects other than the above will be clarified from description of the following embodiments.

BRIEF DESCRIPTION OF DRAWINGS

FIG. 2 illustrates a configuration example of a nonvolatile storage device.
FIG. 3 illustrates a software configuration example of a management device.
FIG. 10 illustrates a configuration example of a key management table.
FIG. 11 illustrates a configuration example of a storage rule table.
FIG. 12 illustrates a configuration example of a transfer rule table.
FIG. 17 illustrates an example of a flowchart of encryption key change.
FIG. 18 illustrates an example of a flowchart of data erasing by erasing of an encryption key.

DESCRIPTION OF EMBODIMENTS

Hereinafter, embodiments of the present invention will be described with reference to the drawings. In the accompanying drawings, functionally the same elements may be denoted by the same number. The accompanying drawings illustrate specific embodiments and examples in accordance with the principle of the invention. The embodiments and examples are used for understanding of the present invention and should not be used for interpreting the present invention in a limited way.

Furthermore, as will be described below, embodiments of the present invention may be implemented by software running on a general-purpose computer, by dedicated hardware, or by a combination of software and hardware.

In the following description, management information will be described in a table format, but the management information does not necessarily have to be expressed by a data structure by a table, and may be expressed by a data structure or a directory structure, such as a list, a DB, or a queue, or other methods. Therefore, the "table", "list", "DB", "queue", and the like may be simply called "information" to show that the information does not dependent on the data structure.

Hereinafter, each processing in an embodiment of the present invention may be described with a "program" as a subject (action entity). Since the program is executed by a processor to perform fixed processing using a memory and a communication port (communication control device), description with the processor as the subject may be given.

The processor operates as a functional unit (means) for realizing a predetermined function by operating according to the program. Part or the whole of the program may be realized by dedicated hardware or may be modularized. Various programs may be installed in computers by a program distribution server or a non-temporary storage medium.

Figure 1:
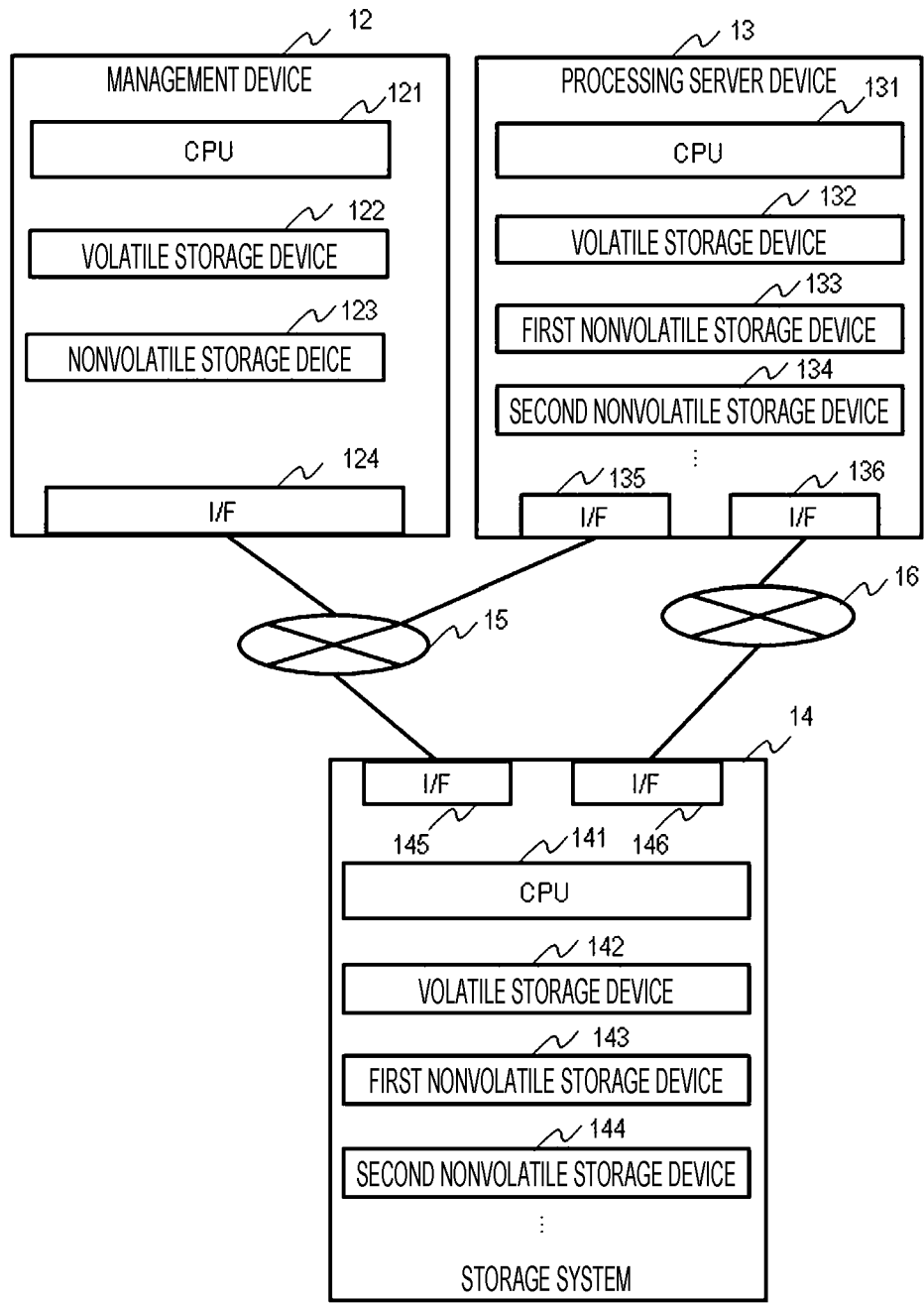
FIG. 1 illustrates a configuration example of a computer system according to an embodiment.

FIG. 1 illustrates a configuration example of a computer system according to an embodiment. The computer system includes a management device 12, a processing server device 13, and a storage system 14. Types of a management network 15 and a storage network 16 are arbitrary, and these networks may be included in one network.

The management device 12 communicates with the processing server device 13 and the storage system 14 via the management network 15 and manages the processing server device 13 and the storage system 14. The management device 12 transmits instructions for various settings and management necessary for operation to the processing server device 13 and the storage system 14.

The management device 12 includes one or a plurality of computers, and typically has a computer configuration in the example of FIG. 1 The management device 12 includes a CPU 121 as a processor, a volatile storage device 122, a nonvolatile storage device 123, and an interface (I/F) 124 for being connected to the management network 15, which are connected via an internal network (for example, a bus (not illustrated)). The CPU 121 realizes a predetermined function by executing a program stored in the volatile storage device 122 as a main memory.

The volatile storage device 122 stores programs executed by the CPU 121 and data used by the programs. The nonvolatile storage device 123 is an auxiliary memory and stores the programs and data to be loaded into the volatile storage device 122.

The processing server device 13 provides a predetermined service to a client (not illustrated). For example, the processing server device 13 operates as a database system. The processing server device 13 includes a CPU 131 as a processor, a volatile storage device 132, a plurality of nonvolatile storage devices including a first nonvolatile storage device 133 and a second nonvolatile storage device 134, and I/Fs 135 and 136. These constituent elements are connected by an internal network (not illustrated). The I/F 135 is an I/F for being connected to the management network 15, and the I/F 136 is an I/F for being connected to the storage network 16.

The CPU 131 realizes a predetermined function by executing a program stored in the volatile storage device 132 as a main memory. For example, the CPU 131 executes a database management system program and a volume management program. The volatile storage device 132 stores the programs executed by the CPU 131 and data used by the programs. The volatile storage device 132 may include a cache area that temporarily stores data of the nonvolatile storage devices.

The processing server device 13 may include the same performance (type) of nonvolatile storage devices or different performances (types) of nonvolatile storage devices. For example, the first nonvolatile storage device 133 is a storage class memory (SCM) device and the second nonvolatile storage device 134 is a flash memory device.

The processing server device 13 is, for example, an in-memory database, and the nonvolatile storage devices store database data (user data). At least a part of the nonvolatile storage devices is the final storage location of the user data. A specific nonvolatile storage device may operate as a cache that temporarily stores the user data. The user data is data used by the database or another application.

The storage system 14 operates as an external storage of the processing server device 13. The processing server device 13 accesses the storage system 14 via the storage network 16. The storage system 14 stores data with a low access frequency, old data, backup data, or the like.

The storage system 14 includes a CPU 141 as a processor, a volatile storage device 142, a plurality of nonvolatile storage devices including a first nonvolatile storage device 143 and a second nonvolatile storage device 144, and I/Fs 145 and 146. These constituent elements are connected by an internal network (not illustrated). The I/F 145 is an I/F for being connected to the management network 15, and the I/F 146 is an I/F for being connected to the storage network 16.

The CPU 141 realizes a predetermined function by executing a program stored in the volatile storage device 142 as a main memory. For example, the CPU 141 processes access requests (read request/write request) from the processing server device 13. The volatile storage device 142 stores the programs executed by the CPU 131 and data used by the programs. The volatile storage device 142 may include a cache area that temporarily stores data.

The storage system 14 may include the same performance (type) of nonvolatile storage devices or different performances (types) of nonvolatile storage devices. For example, the first nonvolatile storage device 143 is a flash memory device and the second nonvolatile storage device 144 is a magnetic disk device.

FIG. 2 illustrates a configuration example of a nonvolatile storage device. The nonvolatile storage device includes a controller 381 and a nonvolatile medium 388. The controller 381 includes a processor 382, a memory 383, a logic circuit 384, I/Fs 385 and 386, and an internal network 387 connecting the aforementioned constituent elements. The I/F 385 is an I/F for communication with a host device, and the I/F 386 is an I/F for communication with the nonvolatile medium 388.

The processor 382 operates according to a program stored in the memory 383 as a main memory, and realizes a predetermined function. For example, the processor 382 processes access requests (read request/write request) received via the I/F 385. The logic circuit 384 executes specific processing, for example, encryption/decryption and compression/decompression of data. Which of the processor 382 and the logic circuit 384 a specific function is implemented in depends on the design.

FIG. 3 illustrates a software configuration example of a management device 12. The volatile storage device 122 stores a key management program 221 and a rule management program 222. The volatile storage device 122 further stores a key management table 223, a storage rule table 224, and a transfer rule table 225. These programs and tables are loaded from, for example, the nonvolatile storage device 123 or downloaded from the outside.

The key management program 221 manages an encryption key to be used by the processing server device 13 and the storage system 14 and sets the encryption key to the processing server device 13 and the storage system 14. The rule management program 222 manages rules of encryption processing at the time of data storage and encryption processing at the time of data transfer in the processing server device 13 and the storage system 14, and sets the rules to the processing server device 13 and the storage system 14.

The CPU 121 functions as a key management unit (key management means) by operating according to the key management program 221, for example, and functions as a rule management unit (rule management means) by operating according to the rule management program 222. Therefore, the management device 12 is a key management device and is also a rule management device. In addition, the CPU 121 executes a volume management program and a program (not illustrated) such as an OS.

The key management table 223 holds information of the encryption keys to be used in the processing server device 13 and the storage system 14. The storage rule table 224 illustrates the rules of encryption processing (encrypted/unencrypted state of data) at the time of data storage in the processing server device 13 and the storage system 14. The transfer rule table 225 holds the rules of encryption processing (encrypted/unencrypted state of data) at the time of data transfer in the processing server device 13 and the storage system 14.

Figure 4:
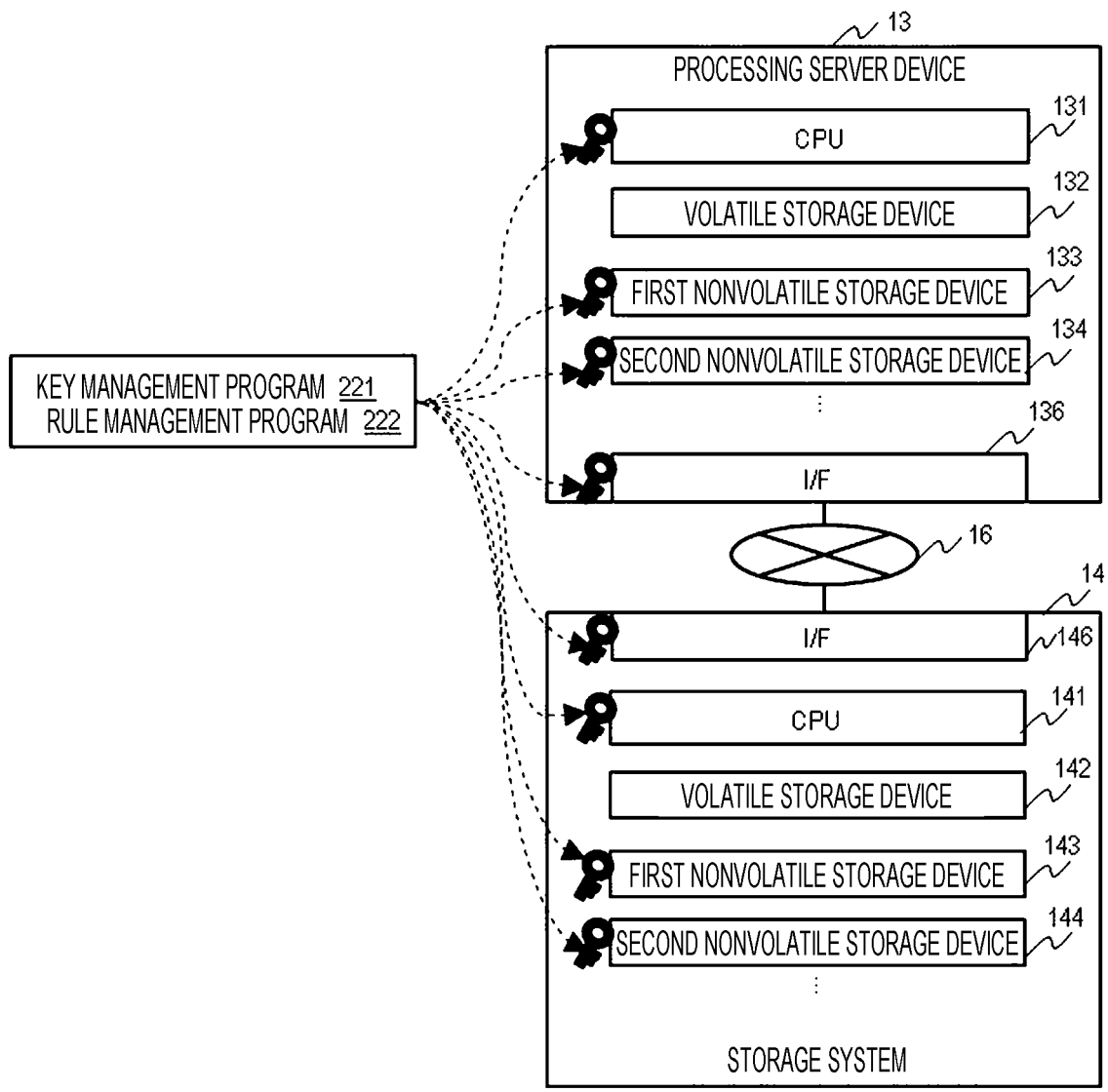
FIG. 4 schematically illustrates setting of an encryption key and a rule.

FIG. 4 schematically illustrates setting of the encryption key and the rules. The key management program 221 respectively sets necessary encryption keys to the devices that execute the encryption processing in the processing server device 13 and the storage system 14. The rule management program 222 sets rules necessary for the device that controls data transfer between the storage devices in the processing server device 13 and the storage system 14. As will be described below, in the case where a processor controls the data transfer between the storage devices, for example, only the processor may refer to the rules.

In the example of FIG. 4, the encryption keys and rules are set to the CPU 131 (the program to be executed), the first nonvolatile storage device 133, the second nonvolatile storage device 134, and the I/F 136 of the processing server device 13. Further, the encryption keys and rules are respectively set to the CPU 141 (application program), the first nonvolatile storage device 143, the second nonvolatile storage device 144, and the I/F 146 of the storage system 14. These devices have an encryption function, and the keys and rules are set to all the devices having an encryption function.

The key management program 221 gives the same key for the same user data, that is, for the user data of the same address, to all the devices that encrypt/decrypt the data. This address corresponds to the user data on a one-to-one basis, and is, for example, an address of an address space defined for the volume. Note that an encryption algorithm is common to all the devices.

With the configuration, the devices can encrypt/decrypt the same data. Note that an unused key is not necessarily set to the devices, and no key needs to be set to a device that does not perform the encryption processing (encryption/decryption) despite having the encryption function.

The rules to be set include a rule in data transfer and a rule in data storage. The transfer rule shows whether the state of data in data transfer is an encrypted text (encrypted data) or a plaintext (unencrypted data). The storage rule shows whether the state of data in data storage is an encrypted text (encrypted data) or a plaintext (unencrypted data). One or both of the rules are set to one device. Both the security and the processing efficiency can be established by the rules.

Note that a plurality of the nonvolatile storage devices may constitute one nonvolatile storage device, and an integrated controller may control access to each of the plurality of nonvolatile storage devices. When the integrated controller has the encryption function, the encryption key and the rules are set in the integrated controller. Here, one storage device and one storage system are each a storage device.

Further, a nonvolatile storage device having no processing function such as encryption/decryption and compression/decompression may be mounted. In this case, the CPU or another nonvolatile storage device may be made to perform processing using the rules in data transfer and the rules in data storage on behalf of the nonvolatile storage device having no processing function.

Figure 5:
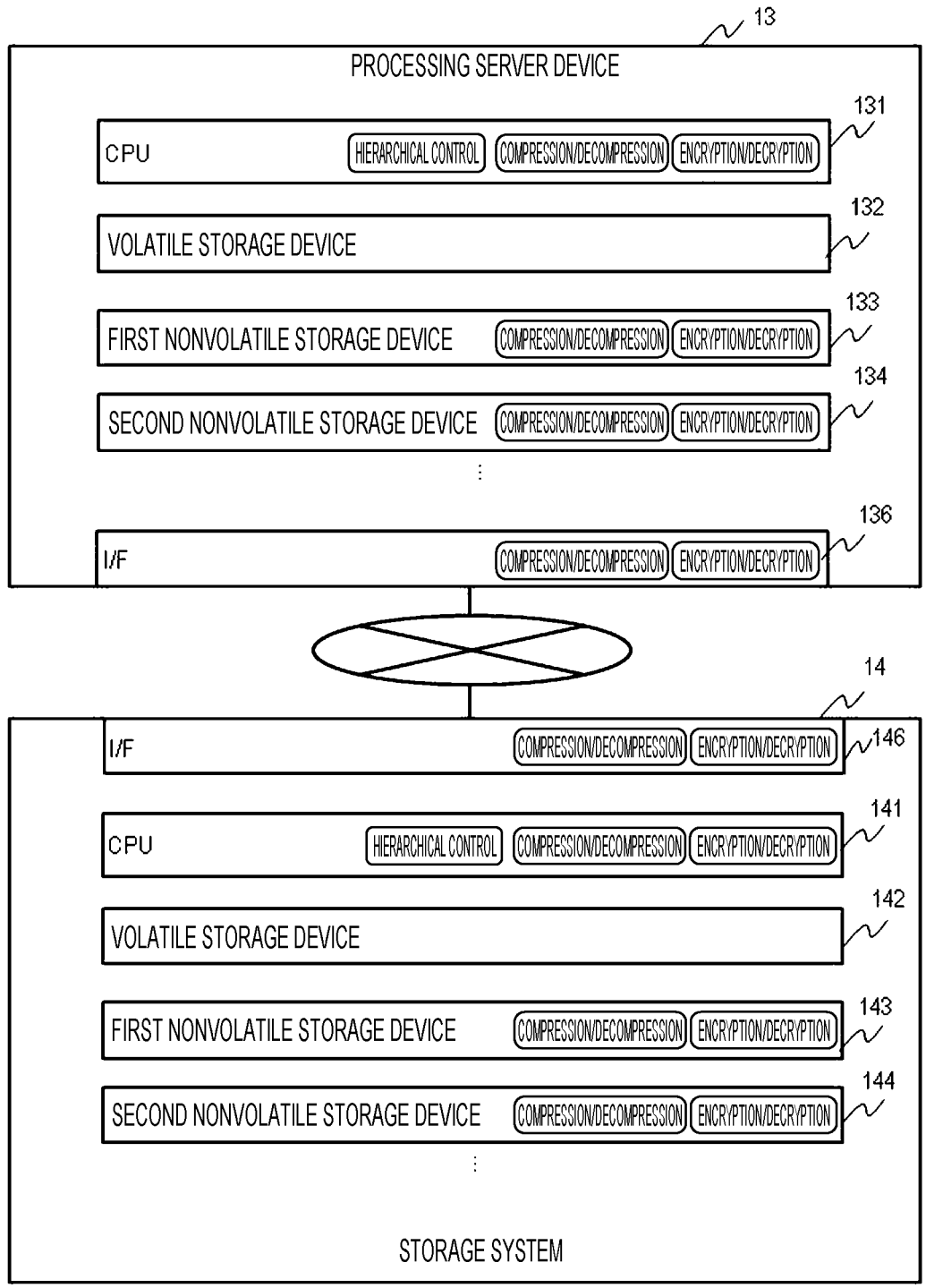
FIG. 5 illustrates an example of functions mounted in a processing server device and devices of the storage system.

FIG. 5 illustrates an example of functions mounted in a processing server device 13 and devices of the storage system 14. In the processing server device 13, the CPU 131 (the program to be executed), the first nonvolatile storage device 133, the second nonvolatile storage device 134, and the I/F 136 perform compression/decompression and encryption/decryption. The compression includes compression by bit operation and compression by deduplication. Note that the compression/decompression function may be omitted.

The CPU 131 further executes hierarchical control. The hierarchical control classifies the plurality of types of storage devices into devices having close performance to configure a plurality of hierarchies (storage hierarchies). The relationship between hierarchies is defined by the hierarchical relationship of performance. The storage devices in the storage system 14 as the external storage may be managed as the lowest layer or may be set to a layer according to the performance of the storage system 14.

The hierarchical control automatically stores data to an appropriate storage device (layer) according to an access (I/O) frequency of the data to improve the system performance, for example. The hierarchical control manages a storage area in predetermined units, and moves a page with a high I/O frequency to an upper layer configured by a high-speed storage device and moves a page with a low I/O frequency to a lower layer configured by a low-speed storage device with a fixed period.

For example, the hierarchical control constitutes a pool including a plurality of logical volumes. Storage areas of a plurality of nonvolatile storage devices constituting a parity group are allocated to each logical volume, for example. As described above, the logical volume is divided into a plurality of hierarchies. The hierarchical control constitutes a virtual volume, and allocates a predetermined unit of storage area (page) from the pool according to write of the virtual volume.

The hierarchical control determines a layer of data of the page according to the I/O frequency of the page, and moves the data to the logical volume of another layer as necessary. Therefore, the page data is transferred from the storage device of a certain layer to the storage device of another layer. According to the present embodiment, efficient data transfer with encryption processing can be performed in frequent data transfer by the hierarchical control. Note that the present embodiment can also be applied to data transfer for a purpose different from the hierarchical control.

In the storage system 14, the CPU 141 (the program to be executed), the first nonvolatile storage device 143, the second nonvolatile storage device 144, and the I/F 146 perform compression/decompression and encryption/decryption. The compression includes compression by bit operation and compression by deduplication.

The CPU 141 further executes hierarchical control. The hierarchical control is as described for the processing server device 13, and allocates a virtual volume to the processing server device 13 and dynamically allocates a unit area from a pool including a plurality of logical volumes to the virtual volume.

Figure 6:
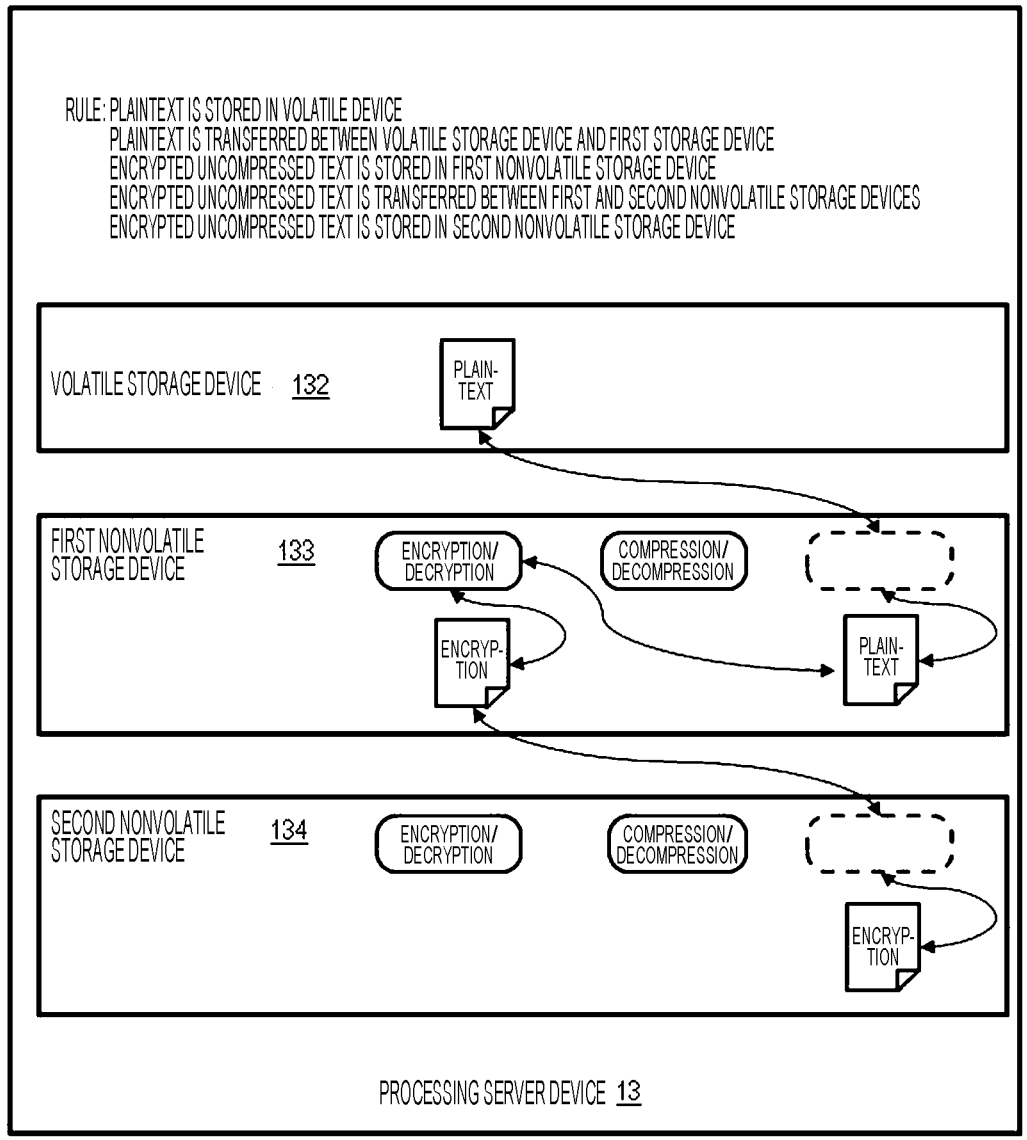
FIG. 6 illustrates rules (storage rules and transfer rules) in the processing server device.

FIGS. 6 to 9 illustrate examples of the rules. FIG. 6 illustrates the rules (storage rules and transfer rules) in the processing server device 13. The rules show the following matters. The volatile storage device 132 stores a plaintext (uncompressed). That is, the CPU 141 (application) stores data in the nonvolatile storage device without encrypting the data. With the rule, a processing load of the CPU 141 is reduced.

The plaintext is transferred between the volatile storage device 132 and the first nonvolatile storage device 133. The first nonvolatile storage device 133 stores an encrypted uncompressed text. The encrypted uncompressed text is transferred between the first nonvolatile storage device 133 and the second nonvolatile storage device 134. The second nonvolatile storage device 134 stores the encrypted uncompressed text.

As illustrated in FIG. 6, the first nonvolatile storage device 133 encrypts the plaintext transferred from the volatile storage device 132 and stores the encrypted text. The first nonvolatile storage device 133 transfers the encrypted text to the second nonvolatile storage device 134 without decrypting the encrypted text. The second nonvolatile storage device 134 stores the received encrypted text as it is.

Further, the second nonvolatile storage device 134 transfers the encrypted text to the first nonvolatile storage device 133 without decrypting the encrypted text. The first nonvolatile storage device 133 stores the received encrypted text as it is. The first nonvolatile storage device 133 decrypts the encrypted text and transfers the plaintext to the volatile storage device 132. The volatile storage device 132 stores the received plaintext as it is.

Figure 7:
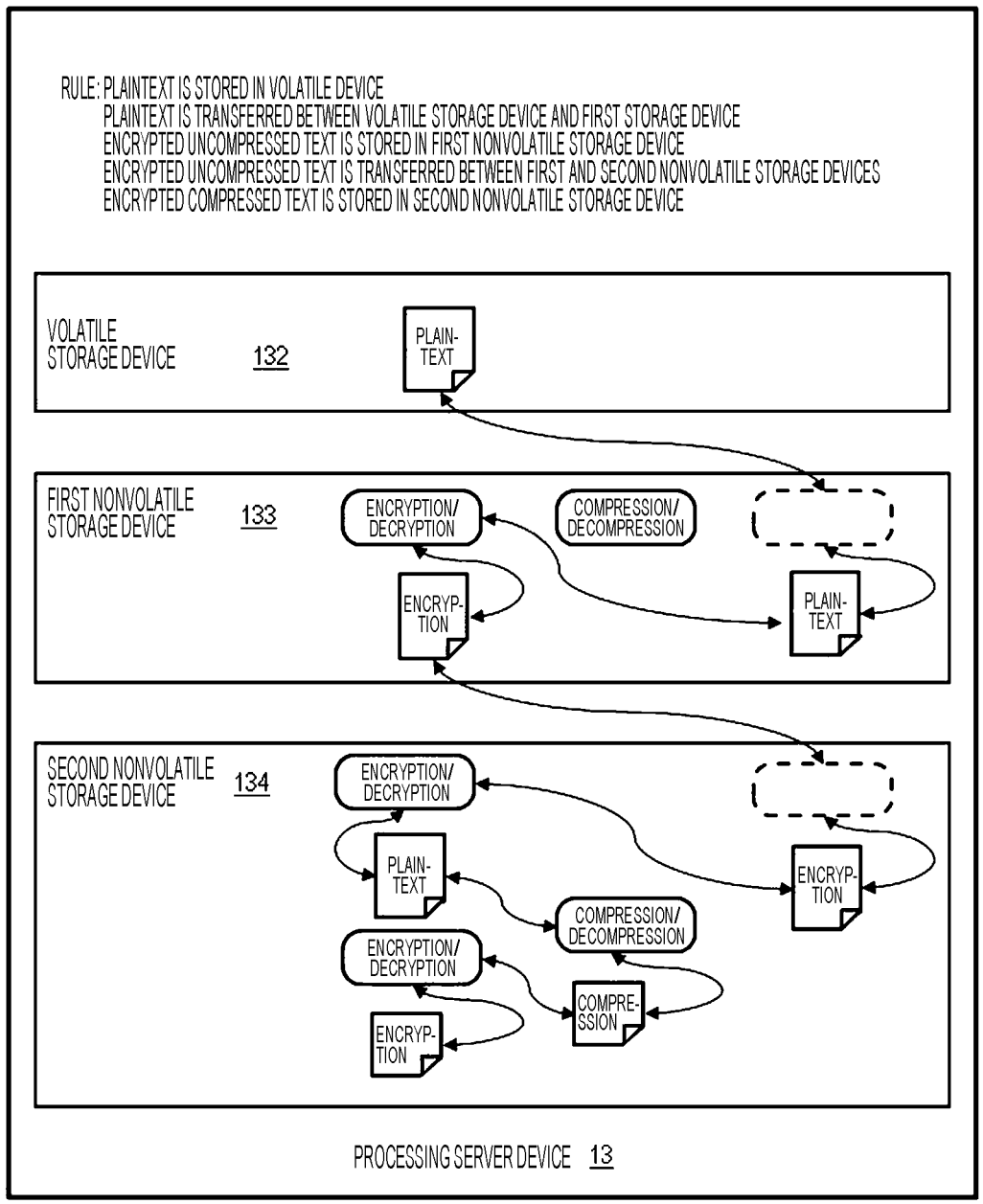
FIG. 7 illustrates another rule in the processing server device.

FIG. 7 illustrates another rules in the processing server device 13. The rules show the following matters. The volatile storage device 132 stores a plaintext (uncompressed). The plaintext is transferred between the volatile storage device 132 and the first nonvolatile storage device 133. The first nonvolatile storage device 133 stores an encrypted uncompressed text. The encrypted uncompressed text is transferred between the first nonvolatile storage device 133 and the second nonvolatile storage device 134. With the rules, the security is improved. The second nonvolatile storage device 134 stores an encrypted compressed text.

As illustrated in FIG. 7, the first nonvolatile storage device 133 encrypts the plaintext transferred from the volatile storage device 132 with a predetermined encryption key and stores the encrypted text. The first nonvolatile storage device 133 transfers the encrypted text to the second nonvolatile storage device 134 without decrypting the encrypted text.

The first nonvolatile storage device 133 and the second nonvolatile storage device 134 hold the same encryption key. Therefore, the second nonvolatile storage device 134 can decrypt the received encrypted text with the encryption key. The second nonvolatile storage device 134 decrypts the received encrypted text, compresses the plaintext, further encrypts the compressed text with the same encryption key, and stores the encrypted text.

Further, the second nonvolatile storage device 134 decrypts, decompresses, and further encrypts the stored data with the same encryption key, and transfers the encrypted text to the first nonvolatile storage device 133. The first nonvolatile storage device 133 stores the received encrypted text as it is. The first nonvolatile storage device 133 decrypts the encrypted text and transfers the plaintext to the volatile storage device 132. The volatile storage device 132 stores the received plaintext as it is.

The storage device that has received the encrypted uncompressed text decrypts and compresses the text, thereby to efficiently compress the data. Furthermore, the compressed text is encrypted and stored, whereby the security can be improved.

Figure 8:
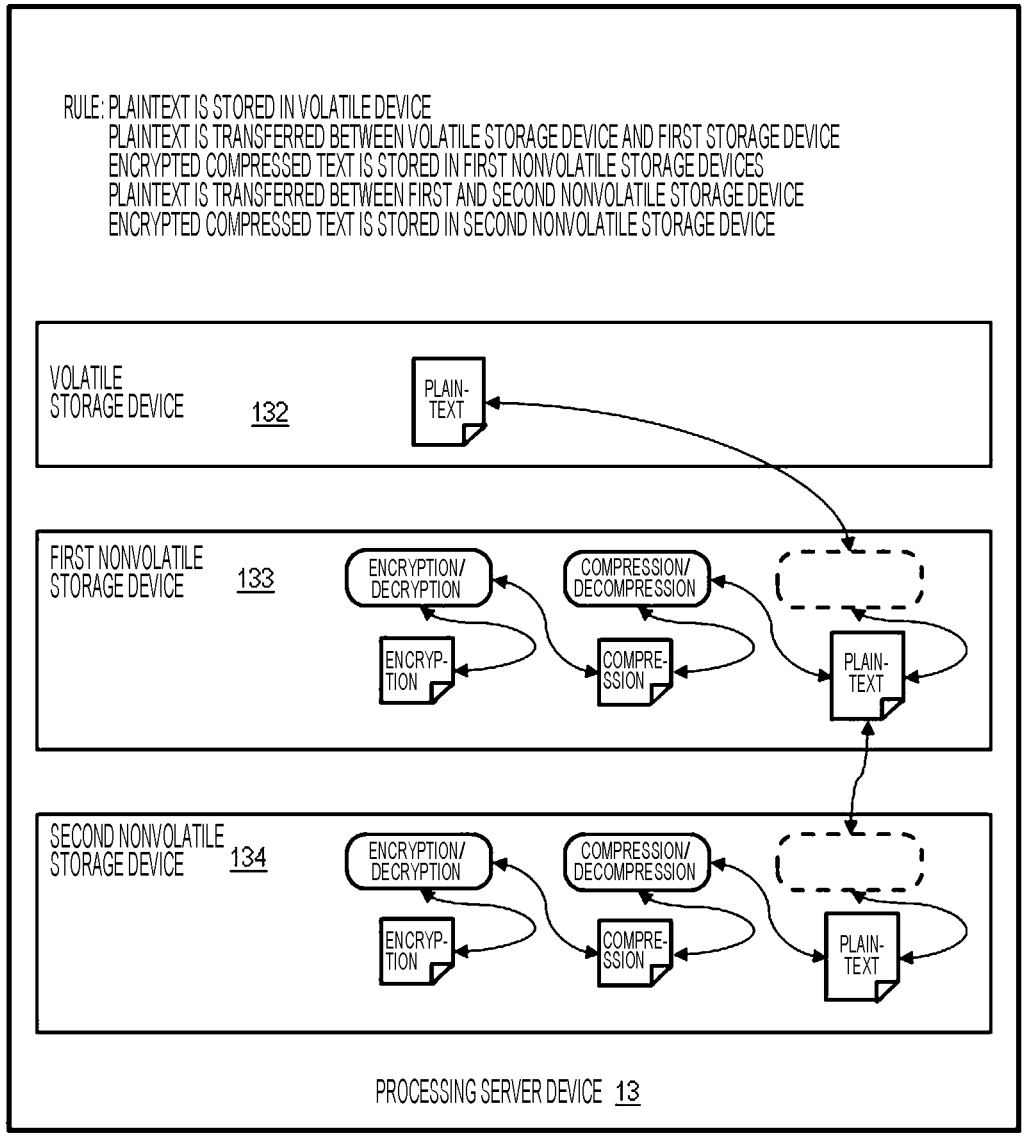
FIG. 8 illustrates another rule in the processing server device.

FIG. 8 illustrates t another rules in the processing server device 13. The rules show the following matters. The volatile storage device 132 stores a plaintext (uncompressed). The plaintext is transferred between the volatile storage device 132 and the first nonvolatile storage device 133. The first nonvolatile storage device 133 stores an encrypted compressed text. A plaintext (uncompressed) is transferred between the first nonvolatile storage device 133 and the second nonvolatile storage device 134. The second nonvolatile storage device 134 stores an encrypted compressed text.

As illustrated in FIG. 8, the first nonvolatile storage device 133 compresses and encrypts the plaintext transferred from the volatile storage device 132, and stores the encrypted compressed text. The first nonvolatile storage device 133 decrypts the encrypted text, further decompresses the plaintext, and transfers the generated plaintext to the second nonvolatile storage device 134. The second nonvolatile storage device 134 compresses the received plaintext, further encrypts the compressed text, and stores the encrypted compressed text.

Further, the second nonvolatile storage device 134 decrypts and further decompresses the stored data, and transfers the generated plaintext to the first nonvolatile storage device 133. The first nonvolatile storage device 133 compresses the received plaintext, further encrypts the compressed text, and stores the encrypted compressed text. The first nonvolatile storage device 133 decrypts the encrypted text, further decompresses the plaintext, and transfers the generated plaintext to the volatile storage device 132. The volatile storage device 132 stores the received plaintext as it is.

Figure 9:
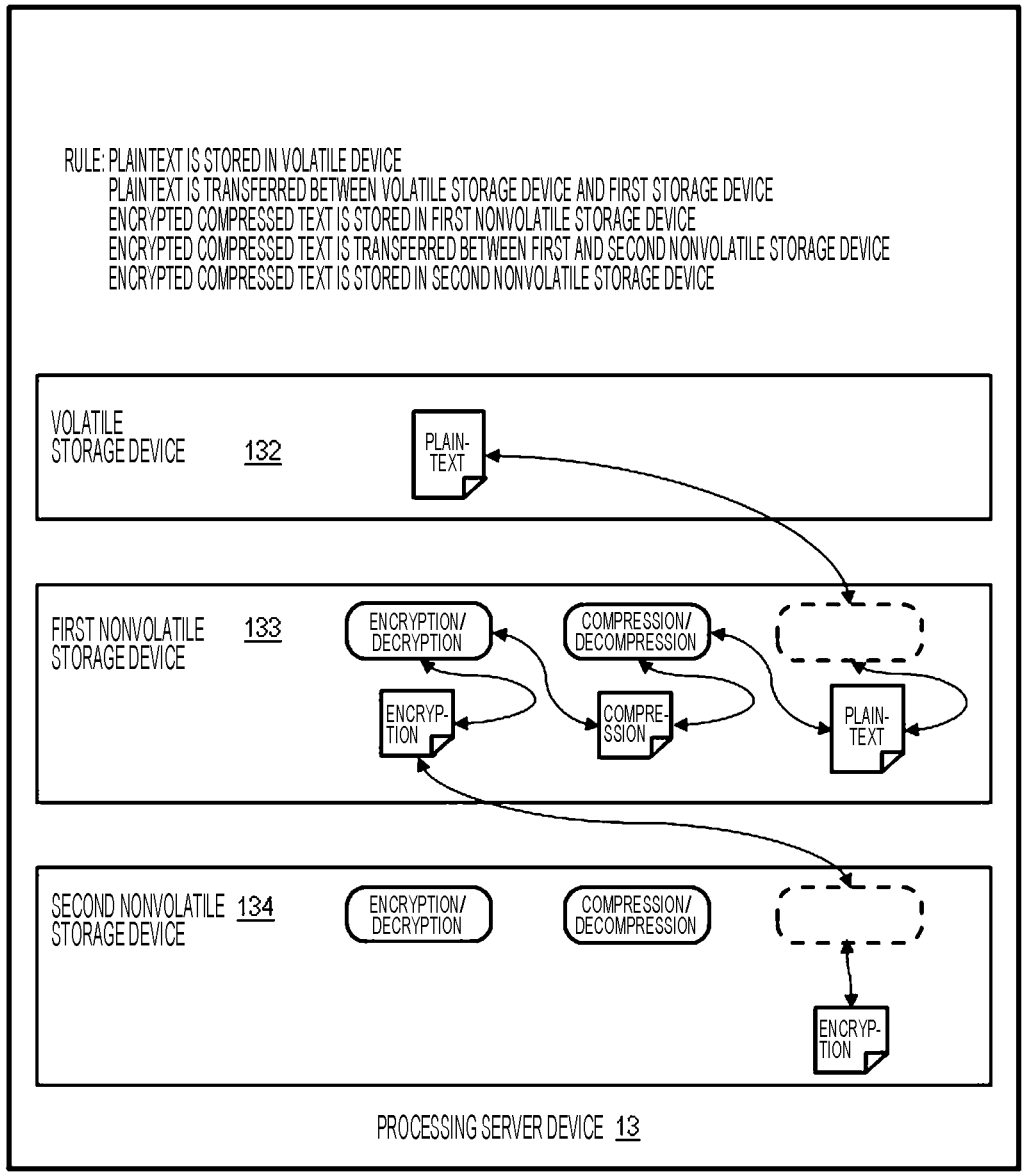
FIG. 9 illustrates another rule in the processing server device.

FIG. 9 illustrates another rules in the processing server device 13. The rules show the following matters. The volatile storage device 132 stores a plaintext (uncompressed). The plaintext is transferred between the volatile storage device 132 and the first nonvolatile storage device 133. The first nonvolatile storage device 133 stores an encrypted compressed text. The encrypted compressed text is transferred between the first nonvolatile storage device 133 and the second nonvolatile storage device 134. The second nonvolatile storage device 134 stores the encrypted compressed text.

As illustrated in FIG. 9, the first nonvolatile storage device 133 compresses and encrypts the plaintext transferred from the volatile storage device 132, and stores the encrypted compressed text. The first nonvolatile storage device 133 transfers the encrypted compressed text to the second nonvolatile storage device 134 without decrypting the encrypted compressed text. The second nonvolatile storage device 134 stores the received encrypted compressed text as it is. As a result, each nonvolatile storage device stores the encrypted compressed text, and the numbers of times of encryption/decryption and compression/decompression are reduced.

Further, the second nonvolatile storage device 134 transfers the encrypted compressed text to the first nonvolatile storage device 133 without decrypting the encrypted compressed text. The first nonvolatile storage device 133 stores the received encrypted compressed text as it is. The first nonvolatile storage device 133 decrypts the encrypted compressed text, further decompresses the plaintext, and transfers the generated plaintext to the volatile storage device 132. The volatile storage device 132 stores the received plaintext as it is.

The first nonvolatile storage device 133 and the second nonvolatile storage device 134 hold the same encryption key. Data encrypted by one nonvolatile storage device can be decrypted by the other nonvolatile storage device.

Therefore, the data can be transferred without decrypting, and the number of times of encryption/decryption of the data can be reduced. Further, the encrypted/unencrypted state in the data transfer can be arbitrarily determined. Therefore, optimum security can be set within the system. Further, the compression function of the storage devices can be effectively used while the security is ensured.

FIG. 10 illustrates a configuration example of the key management table 223. The key management table 223 illustrates the relationship between the encryption key and a range to which the encryption key is applied. In the example of FIG. 10, the key management table 223 includes a device field 231, a volume (VOL) field 232, an address range field 233, and a key field 234. The key field 234 illustrates an identifier of the encryption key. The device field 231 stores an identifier of the storage device to which the encryption key is applied.

The VOL field 232 illustrates an identifier of the volume to which the encryption key is applied. The volume is a volume provided to a host, and is, for example, a virtual volume. The same is applied to the volumes illustrated in other tables. The address range field 233 illustrates an address range to which the encryption key is applied in the volume. The identifier of the volume and a logical address in the volume indicate a volume I/O address.

The key management table 223 holds information of all the encryption keys in the system. Each device holds at least information to be used in the key management table 223. Each device may hold the entire key management table 223. The key management program 221 distributes necessary information in the key management table 223 to each of the devices.

For example, the storage device encrypts/decrypts data with the encryption key specified in a command in read and write of the data. The command to the storage device may indicate the volume I/O address of the data. The storage device identifies the encryption key on the basis of the held key management information and the specified volume I/O address.

The storage device may hold mapping information between a device I/O address and the volume I/O address of the storage device. The device I/O address indicates the storage device identifier and the logical address when accessing the storage device. The storage device can determine the volume I/O address from the device I/O address specified with a command. A device (for example, an I/F) that transfers data can similarly determine the encryption key.

FIG. 11 illustrates a configuration example of the storage rule table 224. The storage rule table 224 illustrates the state of data stored in the storage device. Specifically, the storage rule table 224 illustrates a volume I/O address of data, and an encrypted/unencrypted state and a compressed/uncompressed state of data to be stored.

In the example of FIG. 11, the storage rule table 224 includes a device field 241, a volume (VOL) field 242, an address range field 243, an encryption field 244, and a compression field 245. The device field 241 illustrates an identifier of the storage device. The VOL field 232 illustrates an identifier of the volume to which the storage rule is applied. The address range field 242 illustrates an address range in the volume.

The encryption field 244 illustrates whether each address range stores encrypted data (encrypted text) or unencrypted data (plaintext). The compression field 245 illustrates whether each address range stores compressed data or uncompressed data.

The storage rule table 224 holds information of all the storage devices in the system. Each storage device holds at least information of its own device in the storage rule table 224. The rule management program 222 distributes necessary information in the storage rule table 224 to the storage devices.

The storage device can determine a data storage state, similarly to the above description about the encryption key. For example, a command may instruct the storage state, and the storage device may determine the storage state on the basis of the volume I/O address specified in the command and the storage rule. The storage device may determine the volume I/O address from the device I/O address specified in the command by reference to the held mapping information.

FIG. 12 illustrates a configuration example of the transfer rule table 225. The transfer rule table 225 illustrates encrypted/unencrypted state and compressed/uncompressed state of data in data transfer between devices.

The transfer rule table 225 includes a transmission source field 251, a volume (VOL) field 252, an address range field 253, a transmission destination field 254, a volume (VOL) field 255, an address range field 256, an encryption field 257, and a compression field 258.

The transmission source field 251 illustrates an identifier of a data transmission source device. The VOL field 252 illustrates an identifier of the volume of the data transmission source. The address range field 253 illustrates an address range in the volume of the data transmission source. The transmission destination field 254 illustrates an identifier of a data transmission destination device. The VOL column 255 indicates an identifier of the volume of the data transmission destination. The address range field 256 illustrates an address range in the volume of the data transmission destination.

The encryption field 257 illustrates encrypted/unencrypted state of transfer data. That is, the encryption field 257 illustrates whether the transfer data is encrypted or not. The compression field 258 illustrates compressed/uncompressed state of the transfer data. That is, the compression field 258 illustrates whether the transfer data is compressed or not.

Note that the transfer rule table may be able to set additional items. For example, a flag explicitly indicating decrypting data with the key of the transmission source and encrypting the data again with the key of the transmission destination when transferring data to a portion with a different encryption key may be able to be set, although omitted in the drawing. In this case, an item to specify which of the transmission source and the transmission destination conducts this processing may be included in the table. Note that both the keys are set to the transmission source or the transmission destination that conducts the processing.

The transfer rule table 225 holds information of all the devices in the system. Each device holds at least information of the rules of the data transfer to be controlled in the transfer rule table 225. Each device may hold all the information of the transfer rule table 225. The rule management program 222 distributes necessary information in the storage rule table 224 to the devices.

The device can determine the state of the transfer data similarly to above description about the encryption key and the storage rule. That is, a command specifies the state, or the device determines the state on the basis of the volume I/O address and the transfer rule. The volume I/O address may be specified with the command or may be converted from the device I/O address specified with the command.

Note that, in the hierarchical control of data, the volume and the address in the volume are always the same in the transfer destination and in the transfer source. Therefore, the example of the transfer rule table 225 illustrated in FIG. 12 can also be referred to for data movement other than the hierarchical control.

In the present embodiment, the rules and the encryption key are determined for the address range in the storage device. Therefore, the rules and the encryption keys can be set independently of the storage device. In particular, the rules and the encryption key can be set in an address space of the volume. By accepting the setting of the rules and the encryption key in the address space of the volume, the rules and the encryption key can be set according to an application that uses the data to be stored or characteristics of the data.

An example of data transfer between nonvolatile storage devices and settings of keys and rules therefor will be described with reference to FIGS. 13 and 14. The present example corresponds to the rules illustrated in FIG. 7. In the present example, two nonvolatile storage devices that perform the data transfer refer to the set transfer rules and storage rules and control the data transfer and data storage.

Figure 13:
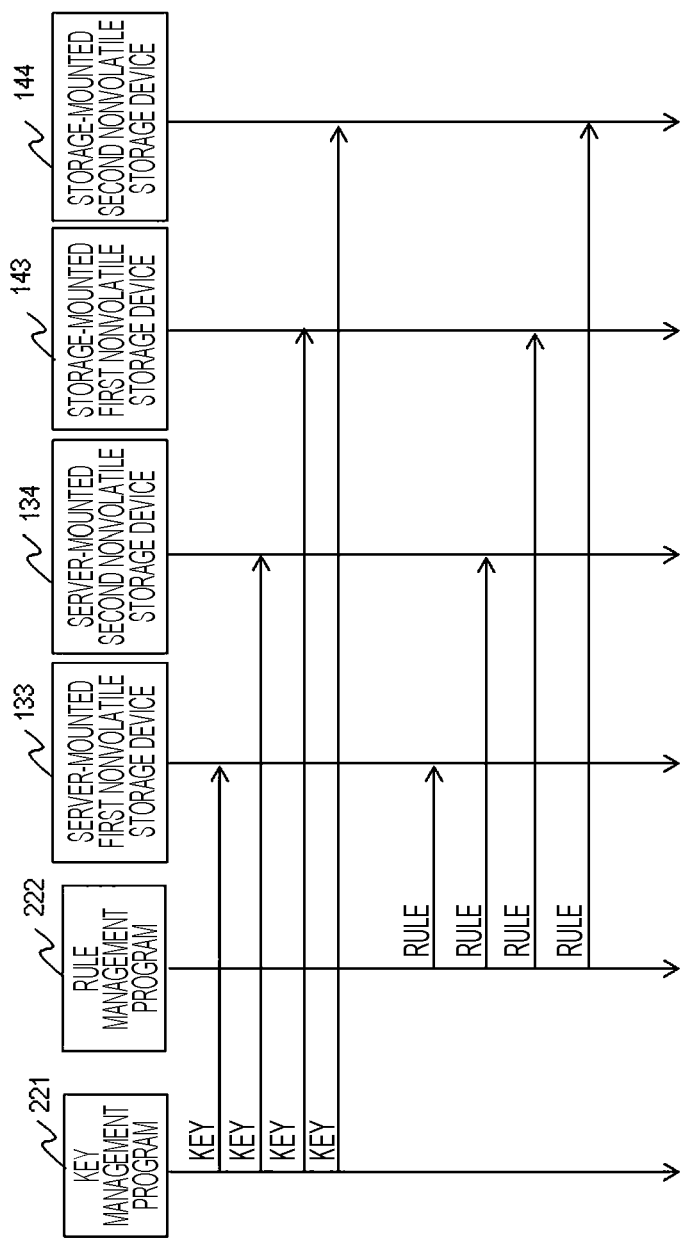
FIG. 13 illustrates an example of key setting and rule setting by a key management program and a rule management program.

FIG. 13 illustrates an example of key setting and rule setting by the key management program 221 and the rule management program 222. The key management program 221 sets the key to the first and second nonvolatile storage devices 133 and 134 of the processing server device 13 and further to the first and second nonvolatile storage devices 143 and 144 of the storage system. In the present example, the key management program 221 distributes corresponding keys and key management information to the devices.

The rule management program 222 sets the rules to the first and second nonvolatile storage devices 133 and 134 of the processing server device 13 and further to the first and second nonvolatile storage devices 143 and 144 of the storage system 14. Specifically, the rule management program 222 distributes corresponding storage rules and transfer rules to the devices. Each device stores the received key, key management information, and rules in the volatile or nonvolatile memory of the controller.

The key, key management information, and rule tables regarding the nonvolatile storage device having no processing function is stored in the nonvolatile storage device having no processing function or stored in another storage device so as to be processed by the CPU, or stored in the volatile or nonvolatile memory of the controller of another nonvolatile storage device so as to be processed by the another nonvolatile storage device. In this case, an item to indicate that the setting is for the nonvolatile storage device having no processing function may be held in each of the tables.

Figure 14:
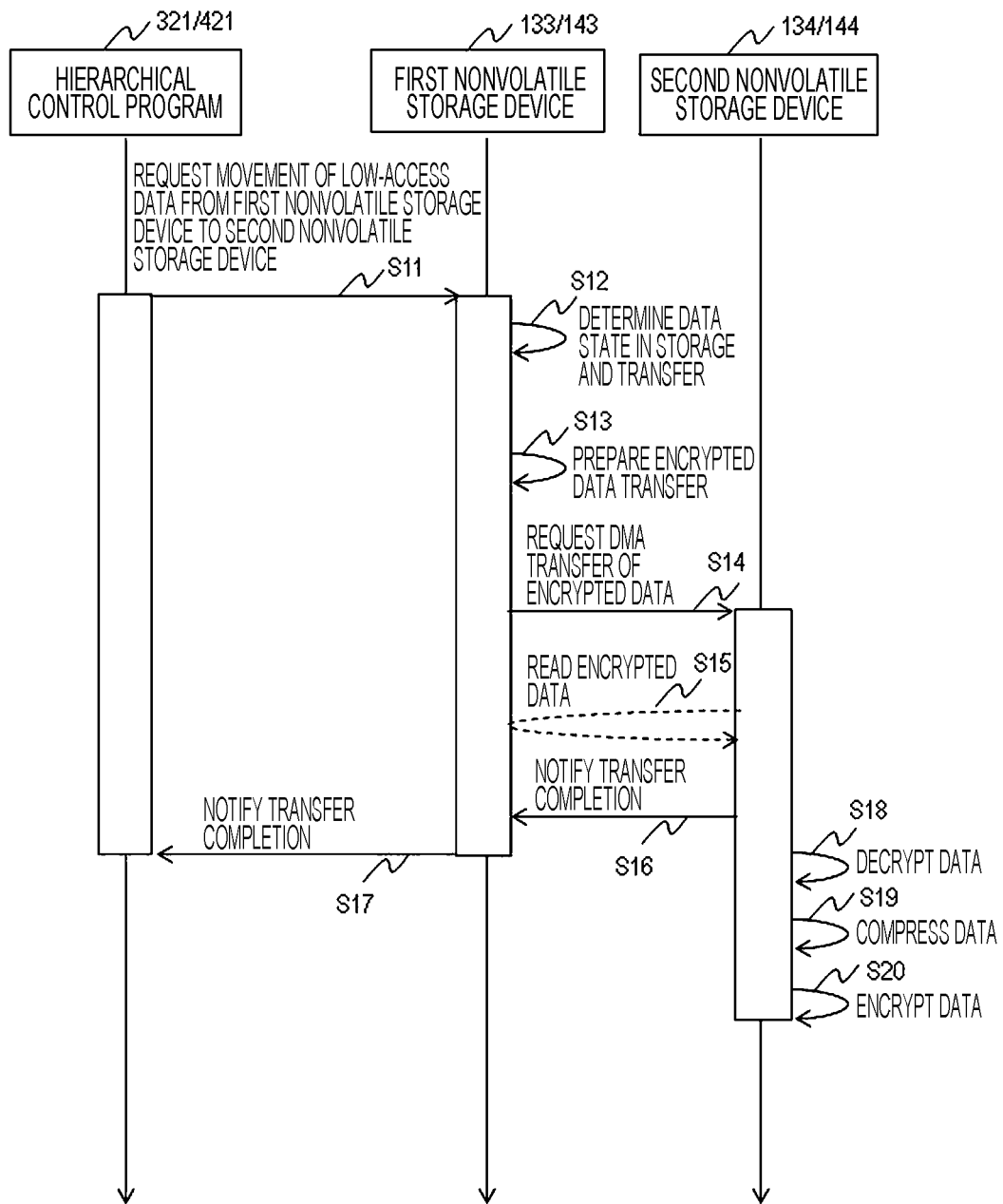
FIG. 14 illustrates an example of data transfer by hierarchical control.

FIG. 14 illustrates an example of data transfer by the hierarchical control. In the example of FIG. 14, data is transferred from the first nonvolatile storage device 133/143 in the processing server device 13 or the storage system 14 to the second nonvolatile storage device 134/144. The first nonvolatile storage device 133/143 stores encrypted uncompressed data. The transfer data is the encrypted uncompressed data. The second nonvolatile storage device 134/144 stores the encrypted compressed data.

In FIG. 14, a hierarchical control program 321/421 of the processing server device 13 or the storage system 14 requests the first nonvolatile storage device 133/143 to transfer data with a low I/O frequency to the second nonvolatile storage device 134/144 (S11). The I/O frequency is monitored and managed by a program (not illustrated).

The transfer request indicates the volume I/O address of the object data in addition to the transfer source device I/O address and the transfer destination device I/O address. The hierarchical control program 321/421 refers to the mapping information between the volume I/O address and the device I/O address to specify the transfer source address, and further determines the address of a newly allocated storage area as the transfer destination.

The first nonvolatile storage device 133/143 refers to the held storage rules and transfer rules, and determines the states of stored data and transfer data of the specified volume I/O address (S12). In the present example, the state of the stored data is encrypted and uncompressed, and the state of the transfer data is encrypted and uncompressed.

The first nonvolatile storage device 133/143 processes the stored data according to the determination result and prepares the transfer data (S13). In the present example, the first nonvolatile storage device 133/143 determines transfer of the data without performing encryption/decryption and compression/decompression processing. The first nonvolatile storage device 133/143 prepares transfer of the specified encrypted data.

Next, the first nonvolatile storage device 133/143 requests the second nonvolatile storage device 134/144 to DMA transfer the prepared encrypted data (S14). The transfer request includes the volume I/O address and the device I/O address of the second nonvolatile storage device 134/144.

The second nonvolatile storage device 134/144 reads the prepared encrypted data from the first nonvolatile storage device 133/143 (S15). When the data transfer is completed, the second nonvolatile storage device 134/144 notifies transfer completion to the first nonvolatile storage device 133/143 (S16). The first nonvolatile storage device 133/143 notifies the transfer completion to the hierarchical control program 321/421 (S17).

The second nonvolatile storage device 134/144 determines the state of the received data and the state of data to be stored on the basis of the specified volume I/O address, transfer rules and storage rules. The second nonvolatile storage device 134/144 processes the received data according to the determination result.

In the present example, the second nonvolatile storage device 134/144 decrypts the received encrypted data (S18) and further compresses the decrypted data (S19). The second nonvolatile storage device 134/144 encrypts the compressed data (S20) and stores the encrypted compressed data. The second nonvolatile storage device 134/144 refers to the key management information and identifies the decryption/encryption key corresponding to the specified volume I/O address.

As described above, two nonvolatile storage devices perform data transfer according to the set rules, thereby to perform the data transfer without involving the CPUs.

Unlike the above example, the request (command) to the device may specify the data storage/transfer state and/or encryption key. The device may hold the mapping information between the volume I/O address and the device I/O address, and the volume I/O address may be omitted from the request (command) to the device. The device can determine the volume I/O address from the specified device I/O address according to the mapping information.

Another example of the data transfer between nonvolatile storage devices and the settings of keys and rules therefor will be described with reference to FIGS. 15 and 16. The present example corresponds to the rules illustrated in FIG. 7. In the present example, the CPU refers to the set transfer rules and storage rules and controls the data transfer and the data storage.

Figure 15:
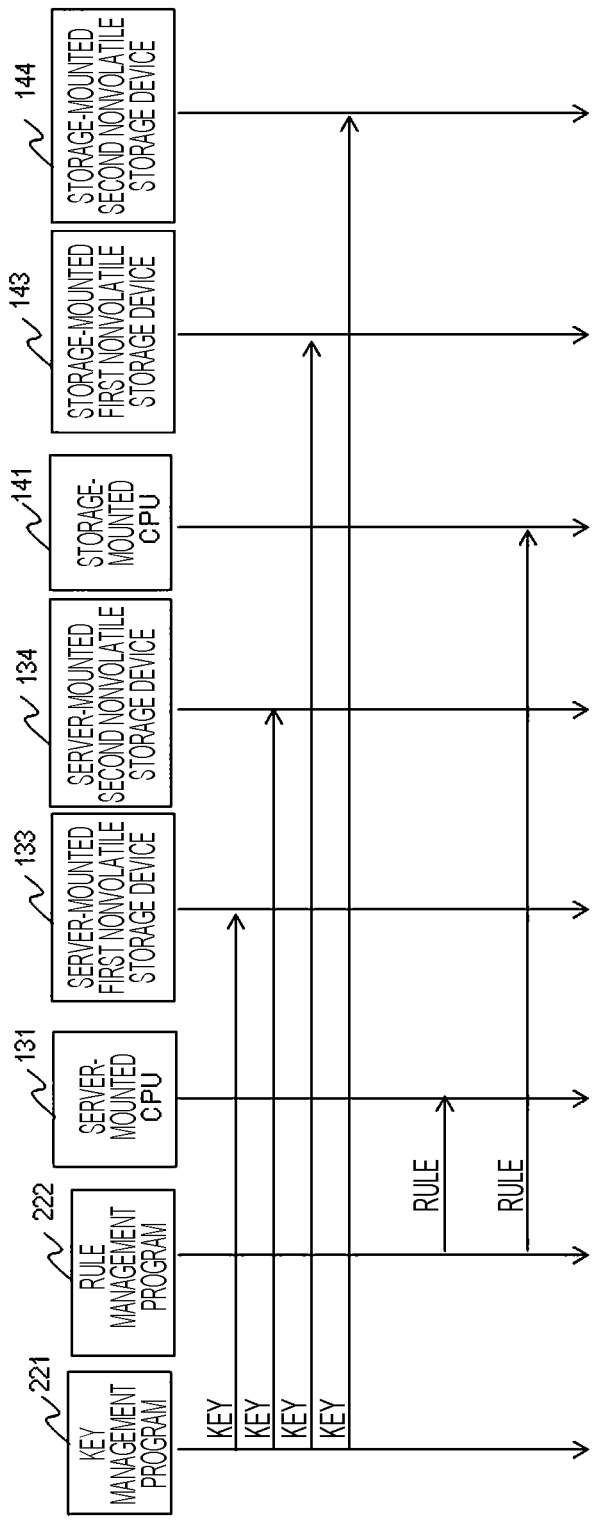
FIG. 15 illustrates another example of the key setting and the rule setting by a key management program and a rule management program.

FIG. 15 illustrates another example of the key setting and the rule setting by the key management program 221 and the rule management program 222. The key management program 221 sets the key to the first and second nonvolatile storage devices 133 and 134 of the processing server device 13 and further to the first and second nonvolatile storage devices 143 and 144 of the storage system. Specifically, the key management program 221 distributes the corresponding keys and key management information to the devices. Each device stores the received key and key management information in the volatile or nonvolatile memory of the controller.

The rule management program 222 sets the rules to the CPU 131 of the processing server device 13 and the CPU 141 of the storage system 14. Specifically, the rule management program 222 distributes the corresponding storage rules and transfer rules to the CPUs 131 and 141. The CPUs 131 and 141 store the received rules in the volatile storage devices 132 and 142, respectively.

Figure 16:
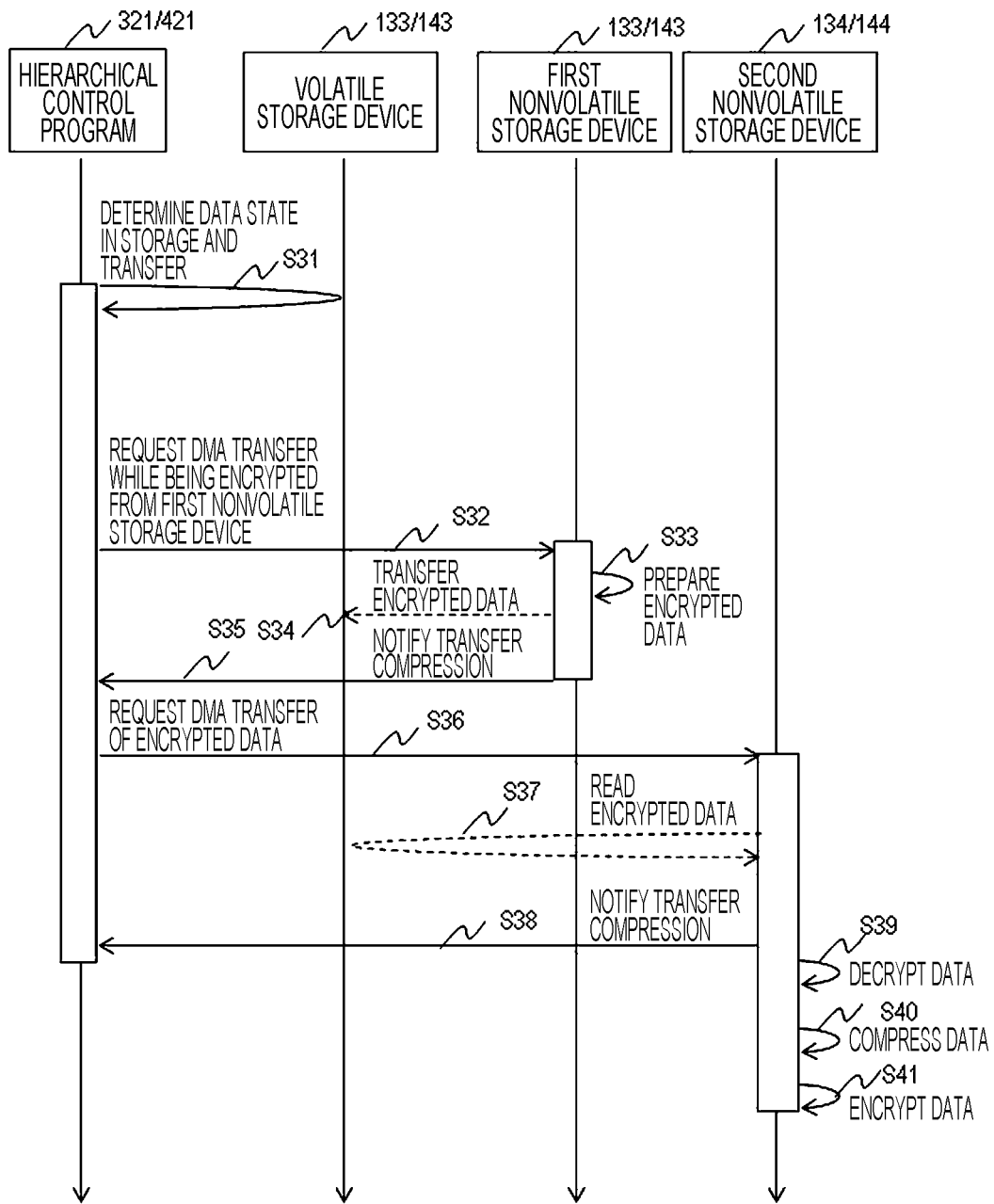
FIG. 16 illustrates an example of the data transfer by hierarchical control.

FIG. 16 illustrates an example of the data transfer by the hierarchical control. In the example of FIG. 16, data is transferred from the first nonvolatile storage device 133/143 in the processing server device 13 or the storage system 14 to the second nonvolatile storage device 134/144. The first nonvolatile storage device 133/143 stores encrypted uncompressed data. The transfer data is the encrypted uncompressed data. The second nonvolatile storage device 134/144 stores the encrypted compressed data.

In FIG. 16, the hierarchical control program 321/421 (CPU 131/141) of the processing server device 13 or the storage system 14 determines transfer of data with a low I/O frequency from the first nonvolatile storage device 133/143 to the second nonvolatile storage device 134/144.

The hierarchical control program 321/421 refers to the storage rules and the transfer rules stored in the volatile storage device 132/142, and determines the states of the stored data and the transfer data according to the volume address of the object data (S31). In the present example, the state of the stored data is encrypted and uncompressed, and the state of the transfer data is encrypted and uncompressed. The hierarchical control program 321/421 determines transfer of the stored data without performing encryption/decryption and compression/uncompression.

The hierarchical control program 321/421 requests the first nonvolatile storage device 133/143 to DMA transfer the data to the volatile storage device 132/142 (S32). The transfer request indicates the volume I/O address, the device I/O address of the first nonvolatile storage device 133/143 at the transfer source, and the address of the volatile storage device 132/142 at the transfer destination. The hierarchical control program 321/421 refers to the mapping information between the volume I/O address and the device I/O address and specifies the transfer source address.

The transfer request further includes an instruction for encryption/decryption and compression/uncompression processing for the data transfer. In the present example, the transfer request does not instruct both the encryption/decryption and the compression/uncompression.

The first nonvolatile storage device 133/143 prepares the transfer data without encrypting/decrypting and compressing/uncompressing the specified data (S33) and transfers the data to the volatile storage device 132/142 by DMA transfer (S34). Thereafter, the first nonvolatile storage device 133/143 notifies transfer completion to the hierarchical control program 321/421 (S35).

Next, the hierarchical control program 321/421 requests the second nonvolatile storage device 134/144 to DMA transfer the data stored in the volatile storage device 132/142 (S36). The transfer request includes the address of the volatile storage device 132/142 at the transfer source, the address (device I/O address) of the second nonvolatile storage device 134/144 at the storage destination, and the volume I/O address. The hierarchical control program 321/421 determines the address of a newly allocated storage area as the transfer destination.

The transfer request further includes an instruction for encryption/decryption and compression/uncompression processing for the data storage. The hierarchical control program 321/421 refers to the storage rules stored in the volatile storage devices 132/142 and determines the state of the object data at the time of storage to the second nonvolatile storage device 134/144. In the present example, the compressed encrypted data is stored. Therefore, the hierarchical control program 321/421 instructs decryption, compression, and encryption of the data.

The second nonvolatile storage device 134/144 reads the data from the volatile storage device 132/142 (S37). When the data transfer is completed, the second nonvolatile storage device 134/144 notifies the transfer completion to the hierarchical control program 321/421 (S38).

The second nonvolatile storage device 134/144 decrypts the received encrypted data (S39). The second nonvolatile storage device 134/144 refers to the key management information, identifies the key of the specified volume I/O address, and decrypts the data using the key.

The second nonvolatile storage device 134/144 compresses the decrypted data (S40). Further, the second nonvolatile storage device 134/144 encrypts the compressed data (S41) and stores the encrypted compressed data.

As described above, even in the case where a nonvolatile storage device has no function to control data transfer, the hierarchical control program 321/421, that is, the CPU 131/141 controls the data transfer according to the set rules, thereby to appropriately perform the data transfer.

In the above example, the CPU refers to both the transfer rules and the storage rules. However, the CPU may hold and refer to only the transfer rules, and the nonvolatile storage device that executes the data transfer may hold and refer to the storage rules. The CPU may hold the key management table and specify the key to be used for data encryption/decryption in the nonvolatile storage device. In this case, the volume I/O address in the transfer request is omitted. The device may hold the mapping information between the volume I/O address and the device I/O address, and the volume I/O address may be omitted from the request (command) to the device.

FIG. 17 illustrates an example of a flowchart of encryption key change. The key management program 221 changes the key in response to a user instruction from an input device, for example. The key management program 221 exchanges an old encryption key with a new encryption key in all the devices using the old key to be exchanged. In the example of FIG. 17, the old encryption key of the first nonvolatile storage devices 133 and 143 and the second nonvolatile storage devices 134 and 144 are exchanged with the new encryption key. The devices using the encryption key are illustrated in the key management table 223.

The key management program 221 issues a stop request for movement of data between hierarchies to the hierarchical control programs 321 and 421 (CPUs 131 and 141) of the processing server device 13 and the storage system 14 (S51). With the request, remaining of data encrypted with the old key after change of the key is avoided.

Next, the key management program 221 transmits a request of encryption key change together with the new encryption key to the first nonvolatile storage devices 133 and 143 and the second nonvolatile storage devices 134 and 144. The exchange request specifies the old encryption key to be exchanged. In the case where the new encryption key has already been distributed, the exchange request may specify the new encryption key in the absence of a new encryption key.

The first nonvolatile storage devices 133 and 143 perform processing for exchanging the specified old encryption key with the received new encryption key according to the received request (S52). The first nonvolatile storage devices 133 and 143 encrypt the storage data with the new encryption key and further update the held key management information.

Specifically, the first nonvolatile storage devices 133 and 143 refer to the held key management information, identify and read the data encrypted with the old encryption key, and decrypt the read data with the old encryption key. The first nonvolatile storage devices 133 and 143 encrypt the decrypted data with the new key and store the encrypted data. The first nonvolatile storage devices 133 and 143 update the information of the old encryption key with the information of the new encryption key in the key management information.

When completing the processing for key exchange, the first nonvolatile storage devices 133 and 143 send an encryption key exchange completion notice to the key management program 221 (management device 12) (S53).

Similarly, the second nonvolatile storage devices 134 and 144 perform the processing for exchanging the specified old encryption key with the received new encryption key according to the received request (S54). When completing the processing for key exchange, the second nonvolatile storage devices 134 and 144 send an encryption key exchange completion notice to the key management program 221 (management device 12) (S55).

When receiving the exchange completion notice from all the devices that has transmitted the key exchange request, the key management program 221 updates the key management table 223. Further, the key management program 221 issues the key exchange completion notice to the hierarchical control programs 321 and 421, and permits resume of the movement of data between hierarchies (S56). Start of the data movement before key exchange completion is avoided by waiting for the key exchange completion notice from all the devices.

FIG. 18 illustrates an example of a flowchart of data erasing by erasing of an encryption key. In the present example, data encrypted with an encryption key is erased from a nonvolatile storage device by erasing the encryption key from the nonvolatile storage device. The key management program 221 erases the encryption key in response to a user instruction from an input device to erase the data.

The key management program 221 refers to the key management table 223 and identifies all the devices that hold the key to be erased. The key management program 221 issues an erasing request specifying the encryption key to each of the identified devices (S71). Each device that has received the erasing request of the encryption key discards the held encryption key, and erases the information of the instructed encryption key from the entry in the held key management information. The device that has erased the encryption key returns an erasing completion notification to the key management program 221.

When receiving the erasing completion notice of the encryption key from all the devices to which erasing of the encryption key has been requested, the key management program 221 erases the information of the encryption key from the key management table 223. As a result, erasing of all the data encrypted with the erased encryption key including backup and difference files is completed (S72). The key management program 221 notifies data erasing completion by erasing of the encryption key to the request source.

The rule management program 222 updates the storage rule table 224 and the transfer rule table 225 according to the updated key management table 223, and further transmits rule update information to the corresponding devices. The rule management program 222 may present the updated transfer rule table 225 to the user on a display device and accept change by the user.

As described above, since the same encryption key is shared for the same data (data with the same address) in the system, the object data in the system can be instantaneously erased by erasure of the corresponding encryption key.

Figure 19:
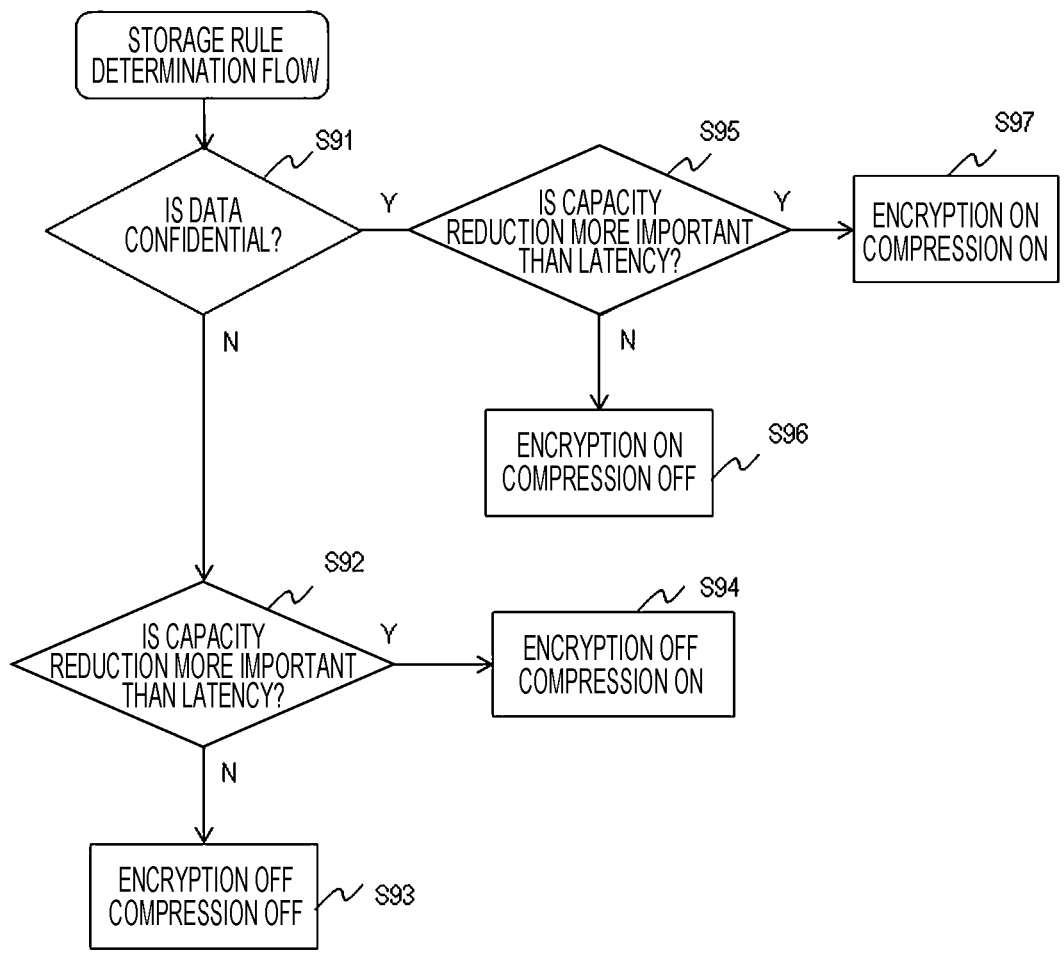
FIG. 19 illustrates an example of a flowchart of determination by a user in determination of a storage rule.

FIG. 19 illustrates an example of a flowchart of determination by a user in determination of a storage rule. The user determines whether the object data is confidential data (S91). In the case where the object data is not confidential data (S91: N), the user determines which of latency and capacity reduction is important for the object data (S92). In the case where the latency is important (S92: N), the user determines storing the object data without encrypting and compressing the object data (S93). In the case where the capacity reduction is important (S92: Y), the user determines compressing and storing the object data without encrypting the object data (S94).

In the case where the object data is confidential data (S91: Y), the user determines which of latency and capacity reduction is important for the object data (S95). In the case where the latency is important (S95: N), the user determines encrypting and storing the object data without compressing the object data (S96). In the case where the capacity reduction is important (S95: Y), the user determines encrypting and further compressing the object data and storing the object data (S97).

The rule management program 222 may refer to an input of a condition on the object data and determine the rules of encryption processing and compression processing for the object data according to the flowchart of FIG. 19. For example, the rule management program 222 acquires information of an object address range, whether the object data is confidential, and which of latency and capacity reduction is important for the object data, via a GUI program of the management device 12.

Figure 20:
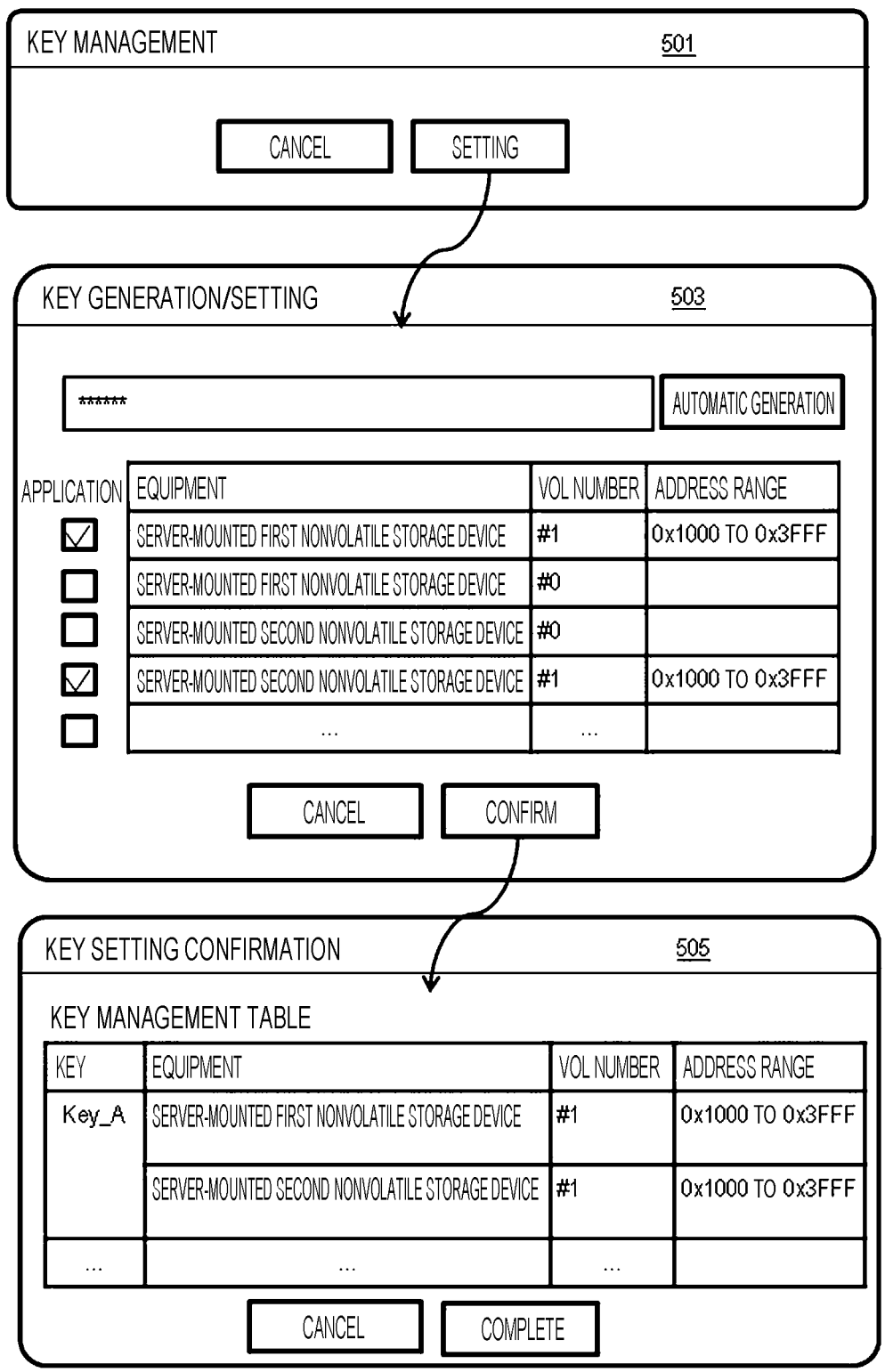
FIG. 20 illustrates a GUI image example for setting key information by the user.

FIG. 20 illustrates a GUI image example for setting key information by the user. The key management program 221 accepts a user input for setting key information from an input/output device using the GUI program. In FIG. 20, selection of a "setting" button in a key management image 501 enables the user to perform an input on a key generation/setting image 503.

The key generation/setting image 503 accepts an input of an encryption key or an input of automatic generation of the encryption key. The key generation/setting image 503 further accepts the volume I/O address of data to which the encryption key is applied. In the example of FIG. 20, the storage device, the volume identifier, and the address in the volume (address range) enable selection of an object to which the encryption key is applied.

The volume is a volume used by the host (user), and is, for example, a virtual volume. Information of the volume can be acquired from volume management information managed by the volume management program (both are not illustrated). The encryption key application range may be specified in units of volume or capacity pool.

When a "confirm" button in the key generation/setting image 503 is selected, the key management program 221 displays the input information in a key setting confirmation image 505. The user selects "cancel" in the key generation/setting image 503 in the case where there is a problem with the displayed information, and selects a "complete" button in the case where there is no problem.

When the "complete" button is selected, the key management program 221 generates an encryption key according to the inputted information, and further updates/generates the key management table 223. As illustrated in FIG. 10, the key management table 223 illustrates the relationship between the encryption key and the volume I/O address (the volume identifier and the address in the volume).

As described above, accepting the user input of the setting range of the encryption key can cause the system to execute appropriate encryption processing for the user.

Figure 21:
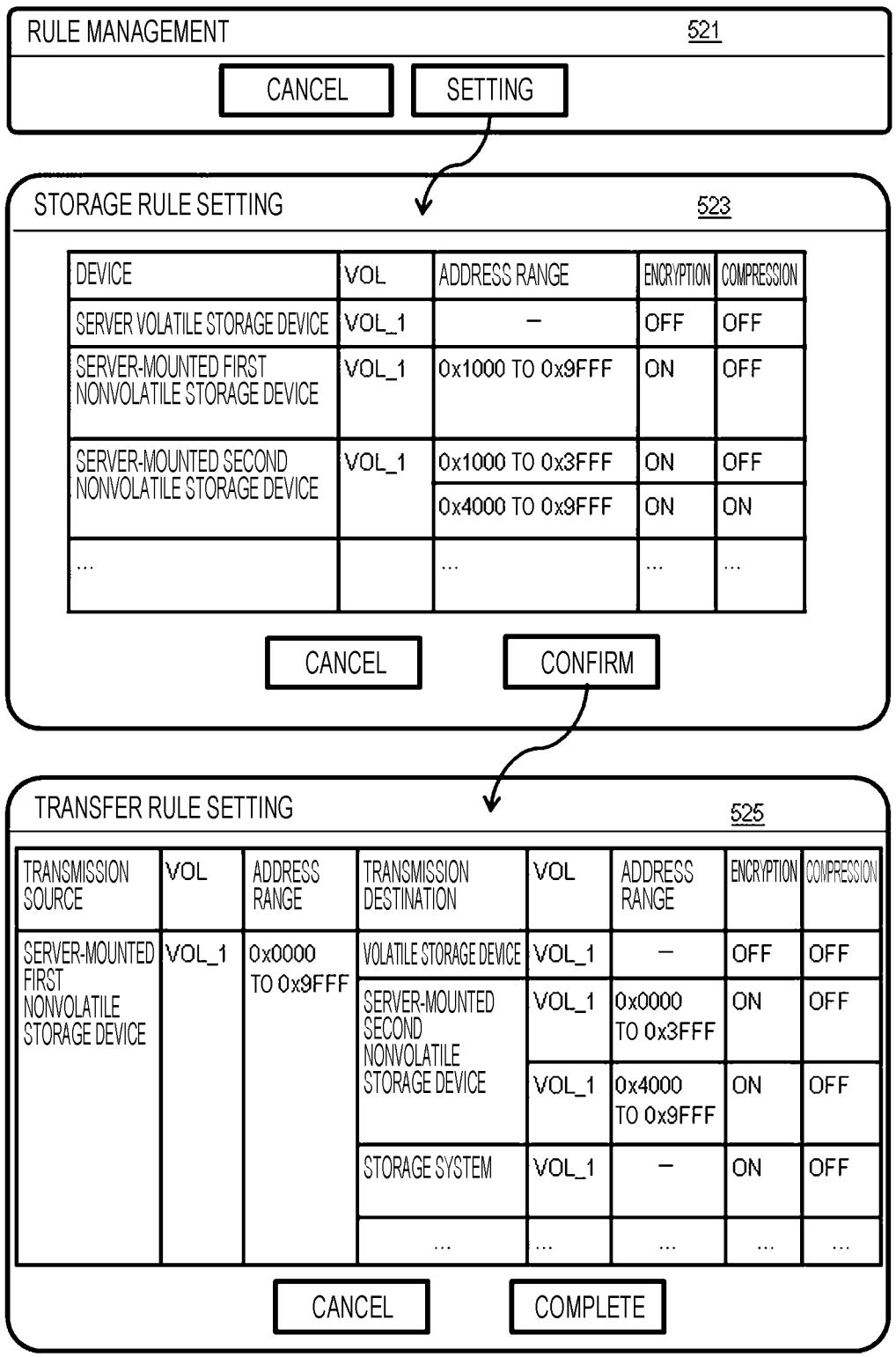
FIG. 21 illustrates a GUI image example for setting rule information by the user.

FIG. 21 illustrates a GUI image example for setting rule information by the user. The rule management program 222 accepts a user input for setting rule information, using a GUI program. In FIG. 21, selection of a "setting" button in a rule management image 521 enables the user to perform an input on a storage rule setting image 523.

The storage rule setting image 523 accepts specification of encryption/decryption and compression/uncompression of stored data in each of volume address ranges. The storage rule setting image 523 may accept specification of encryption/decryption and compression/uncompression of the stored data in units of volume or capacity pool.

When a "confirm" button in the storage rule setting image 523 is selected, the rule management program 222 updates/generates the storage rule table 224. The rule management program 222 updates/generates a temporary transfer rule according to the new storage rule table 224, and displays the rule in a transfer rule setting image 525.

For example, in the case where at least one of a transfer source and a transfer destination is set to unencryption (encryption OFF), the rule management program 222 specifies unencryption (encryption OFF) for data transfer between the transfer source and the transfer destination. In the case where both the transfer source and the transfer destination are set to encryption (encryption ON), the rule management program. 222 specifies encryption (encryption ON) for the data transfer between the transfer source and the transfer destination.

For example, in the case where at least one of the transfer source and the transfer destination is set to uncompression (compression OFF), the rule management program 222 specifies uncompression (compression OFF) for data transfer between the transfer source and the transfer destination. In the case where both of the transfer source and the transfer destination are set to compression (compression ON), the rule management program 222 specifies compression (compression ON) for data transfer between the transfer source and the transfer destination.

The rule management program 222 accepts setting change by the user in the transfer rule setting image 525 and reflects the setting change on the temporary transfer rule. When the "confirm" button in the transfer rule setting image 525 is selected, the rule management program 222 updates/generates the transfer rule table 225 according to a new transfer rule.

Further, setting of a nonvolatile storage device having no processing function is possible. In this case, setting of another nonvolatile storage device is taken over, or another nonvolatile storage device or a CPU performing the processing on behalf of the nonvolatile storage device having no processing function at the time of transfer is set. For example, in the case where another nonvolatile storage device is set to encryption ON and compression ON, the state is taken over and the nonvolatile storage device having no processing function is set to an encryption ON and compression ON storage state. In the case of encryption OFF or compression OFF, an upper nonvolatile storage device or the CPU may perform the processing on behalf of the nonvolatile storage device having no processing function.

Figure 22:
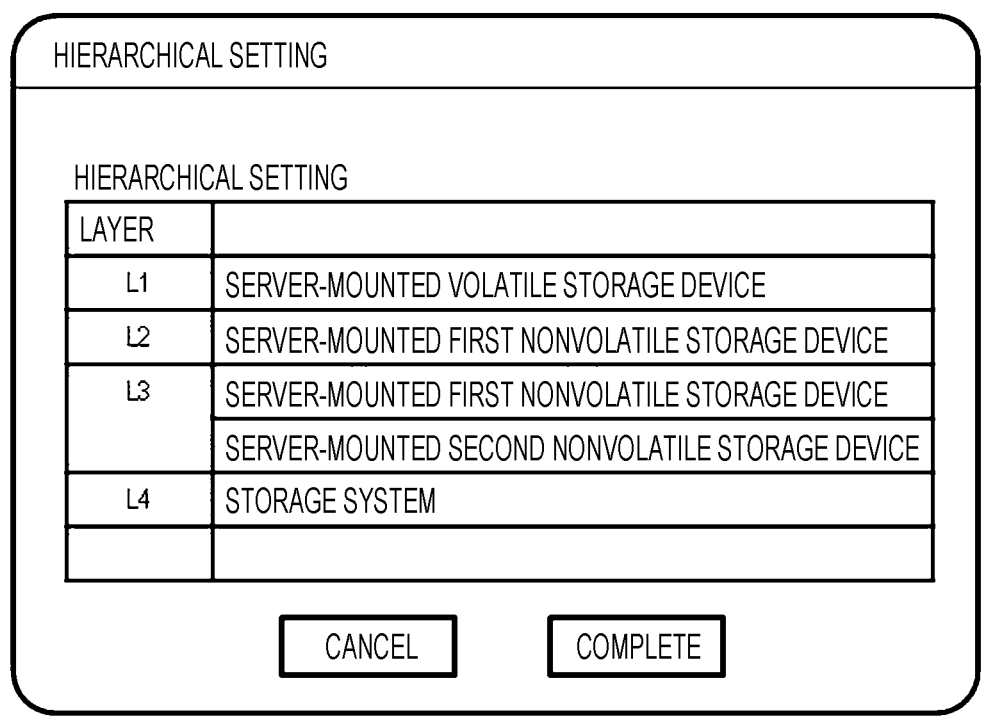
FIG. 22 illustrates a GUI image example for setting a layer in the hierarchical control.

FIG. 22 illustrates a GUI image example for setting a layer in the hierarchical control. The user specifies a storage device to which a layer belongs in the GUI image. The hierarchical control programs 321 and 421 receive information input via the GUI image displayed on the management device 11 and perform the hierarchical control according to the setting information.

Figure 23:
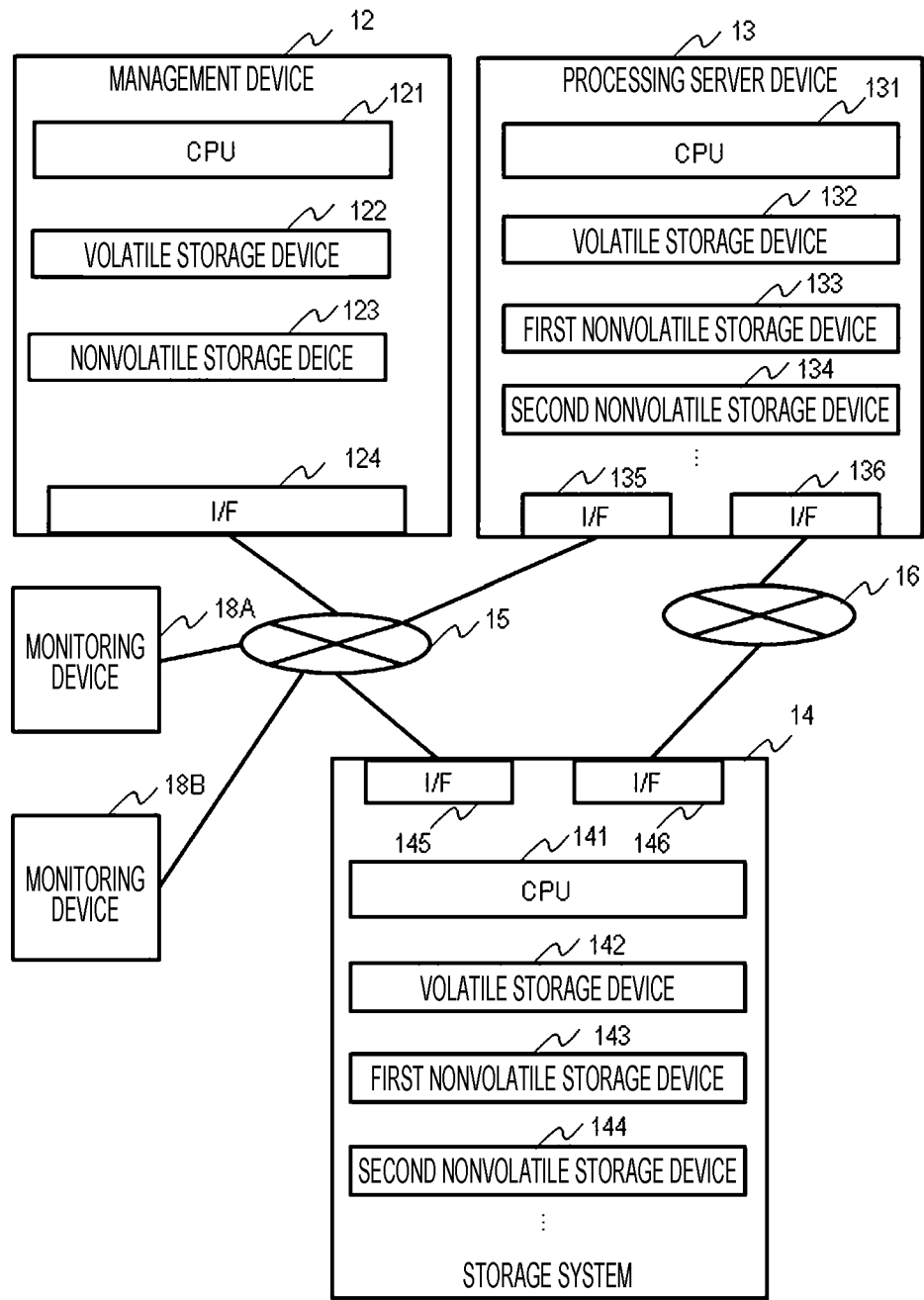
FIG. 23 illustrates another system configuration example.

FIG. 23 illustrates another system configuration example. The computer system includes a plurality of monitoring devices. FIG. 23 illustrates two monitoring devices 18A and 18B. The monitoring devices 18A and 18B are connected to the management device 12 via the network 15. The monitoring devices 18A and 18B can have a similar computer configuration to the management device 12.

A plurality of administrators operates the monitoring devices, monitors inappropriate change of the key management information and the rule management information, and ensures the security on operation. For example, when a certain administrator changes the storage rule or the transfer rule, the rule management program 222 notifies the change contents to the monitoring devices 18A and 18B. The monitoring devices 18A and 18B display the notification content. For example, another administrator who is monitoring the system with the monitoring device 18B can know the change contents of the rule.

The rule management program 222 notifies a warning to the monitoring devices 18A and 18B in the case of a change that deviates from a predetermined rule. With the notification, the administrators can know the unauthorized operation. The same applies to the key management information, and a plurality of persons can monitor unauthorized operations, for example, unauthorized key exchange.

The number of the monitoring devices may be one. With the plurality of monitoring devices, an operation by one administrator can be monitored by the other administrators. Further, even if one monitoring device stops, another monitoring device can continue monitoring.

Figure 24:
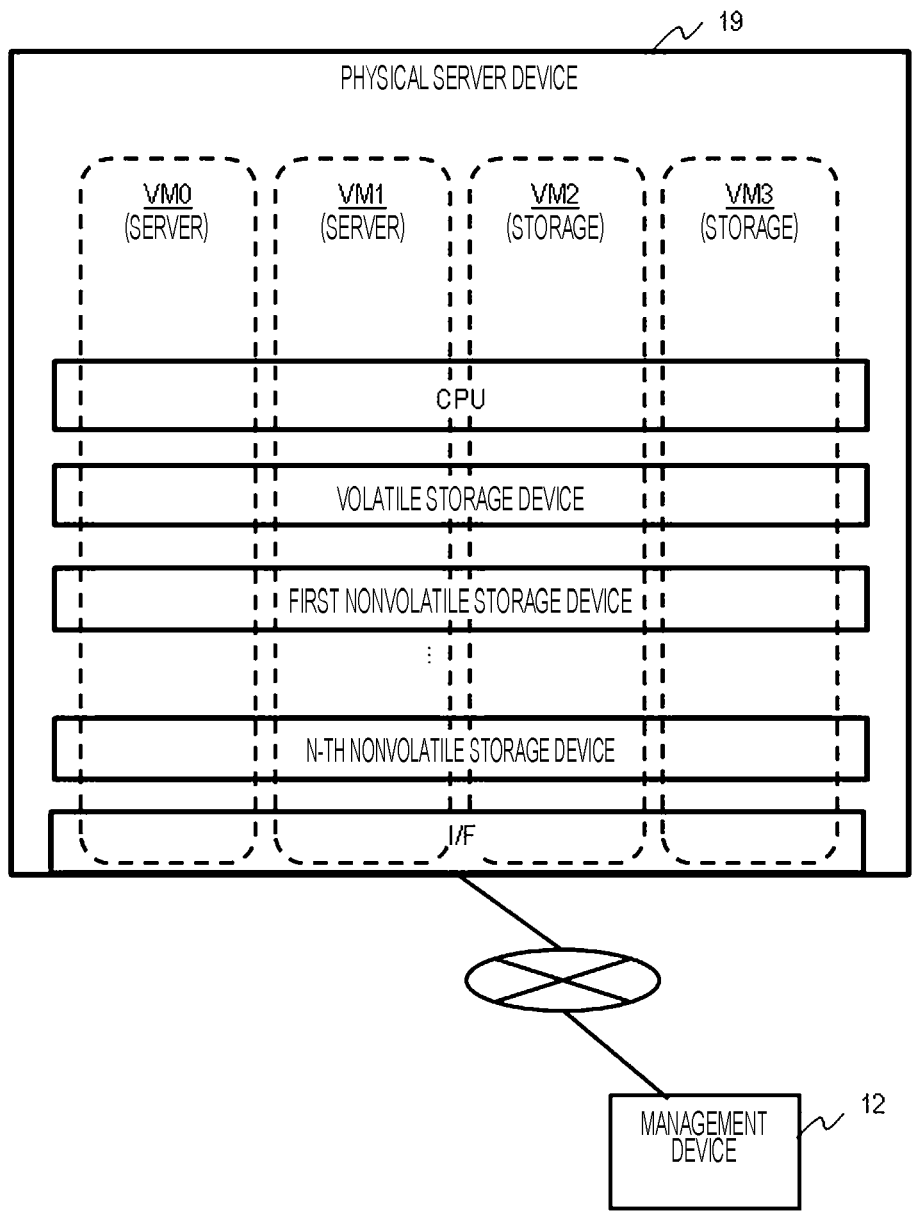
FIG. 24 illustrates another system configuration example.

FIG. 24 illustrates another system configuration example. A physical server device 19 is connected to the management device 12 via a network. Due to virtualization, a plurality of virtual machines is operating in the physical server device 19. For example, a logical partition (LPAR) method or a virtual machine (VM) method can be used for the virtualization.

Virtual machines VM0 and VM1 are virtual processing server devices, and virtual machines VM2 and VM3 are virtual storage systems. Physical resources of the physical server device 19 include a CPU, a volatile storage device, a plurality of nonvolatile storage devices, and an interface. The physical resources are allocated to each of the virtual machines.

The above-described contents in the configuration including the physical processing server device 13 and the physical storage system 14 can also be applied to a system including virtual machines as illustrated in FIG. 24. The descriptions of the physical processing server device 13 and the physical storage system 14 are respectively applied to the virtual processing server device and the virtual storage system.

Note that the present invention is not limited to the above-described embodiments and includes various modifications. For example, the above embodiments have been described in detail for easy understanding of the present invention, and the present invention is not necessarily limited to one including all the described configurations. Further, a part of the configuration of a certain embodiment can be replaced with the configuration of another embodiment. Further, the configuration of another embodiment can be added to the configuration of a certain embodiment. Further, another configuration can be added to/deleted from/replaced with a part of the configurations of the embodiments.

Further, a part or all of the above-described configurations, functions, processing units, and the like may be realized by hardware by being designed with an integrated circuit or the like. Further, the above-described configurations, functions, and the like may be realized by software in such a manner that programs that realize the respective functions are interpreted by the processor. The information such as the programs, tables, and files that realize the functions can be stored in a recording device such as a memory, a hard disk, or a solid state drive (SSD), or in a recording medium such as an IC card or an SD card.

Further, the control lines and information lines necessary for the description have been illustrated, and not all the control lines and information lines for a product are necessarily illustrated. It may be considered that almost all the configurations are actually connected with one another. Although redundant paths of the devices are not described, it may be considered that there is actually connection for redundancy in the network such as the server, the storage, the management device, the monitoring device, and the like.

The invention claimed is:

1. A computer system comprising:
a first device comprising:
a first volatile storage device that stores a rule management program and a key management program; and
a first processor configured to execute the rule management program and key management program to set predetermined rules and encryption keys to a second device via a network; and
the second device comprising:
a second processor;
a second volatile storage device that stores a program to be executed by the second processor; and
a plurality of nonvolatile storage devices that store data, wherein
each of the plurality of nonvolatile storage devices holds encryption keys for encrypting and decrypting data set according to the key management program, the encryption keys held at each of the plurality of nonvolatile storage devices comprises at least a first encryption key for encrypting and decrypting first data, and
each nonvolatile storage device in the plurality of nonvolatile storage devices holds predetermined rules for determining a state of data at a time of transfer set according to the rule management program, each nonvolatile storage device in the plurality of nonvolatile storage devices transfers the first data to another nonvolatile storage device in the plurality of nonvolatile storage devices in an encrypted or unencrypted state, the encrypted or unencrypted state determined according to the predetermined rules, wherein
according to a predetermined rule of the predetermined rules held at a first nonvolatile storage device in the plurality of nonvolatile storage devices, the first nonvolatile storage device
decrypts the first data received in the encrypted state with the first encryption key,
encrypts the decrypted first data with the first encryption key after compression, and
stores the compressed and encrypted first data.

2. The computer system according to claim 1, wherein the predetermined rule indicates that the first data is transferred in the unencrypted state from each nonvolatile storage device in the plurality of nonvolatile storage devices to the second volatile storage device.

3. A computer system comprising:
a first device comprising:
a first volatile storage device that stores a rule management program and a key management program; and
a first processor configured to execute the rule management program and key management program to set predetermined rules and encryption keys to a second device via a network; and
the second device comprising:
a second processor;
a second volatile storage device that stores a program to be executed by the second processor; and
a plurality of nonvolatile storage devices that store data, wherein
each of the plurality of nonvolatile storage devices holds encryption keys for encrypting and decrypting data set according to the key management program, the encryption keys held at each of the plurality of nonvolatile storage devices comprises at least a first encryption key for encrypting and decrypting first data, and each nonvolatile storage device in the plurality of nonvolatile storage devices holds predetermined rules for determining a state of data at a time of transfer set according to the rule management program, each nonvolatile storage device in the plurality of nonvolatile storage devices transfers the first data to another nonvolatile storage device in the plurality of nonvolatile storage devices in an encrypted or unencrypted state, the encrypted or unencrypted state determined according to the predetermined rules, wherein the predetermined rules indicate a compressed or uncompressed state of data to be transferred, and each nonvolatile storage device in the plurality of nonvolatile storage devices transfers the first data to another nonvolatile storage device in the plurality of nonvolatile storage devices in the compressed or uncompressed state, the compressed or uncompressed state determined according to the predetermined rules.

4. A computer system comprising:
a first device comprising:
  a first volatile storage device that stores a rule management program and a key management program; and
  a first processor configured to execute the rule management program and key management program to set predetermined rules and encryption keys to a second device via a network; and
the second device comprising:
  a second processor;
  a second volatile storage device that stores a program to be executed by the second processor; and
  a plurality of nonvolatile storage devices that store data, wherein
  each of the plurality of nonvolatile storage devices holds encryption keys for encrypting and decrypting data set according to the key management program, the encryption keys held at each of the plurality of nonvolatile storage devices comprises at least a first encryption key for encrypting and decrypting first data, and
  each nonvolatile storage device in the plurality of nonvolatile storage devices holds predetermined rules for determining a state of data at a time of transfer set according to the rule management program, each nonvolatile storage device in the plurality of nonvolatile storage devices transfers the first data to another nonvolatile storage device in the plurality of nonvolatile storage devices in an encrypted or unencrypted state, the encrypted or unencrypted state determined according to the predetermined rules, wherein
the predetermined rules indicate the encrypted or unencrypted state associated with a plurality of address ranges, and
each nonvolatile storage device in the plurality of nonvolatile storage devices transfers, in the encrypted or unencrypted state associated with each address range that store data according to the predetermined rules, the data in the each address ranges to another nonvolatile storage device in the plurality of nonvolatile storage devices.

5. The computer system according to claim 4, wherein each nonvolatile storage device in the plurality of nonvolatile storage devices uses an encryption key associated with the each address range in encryption and decryption of the data in the each address range.

6. The computer system according to claim 4, wherein the encrypted or unencrypted state in data transfer is preset for an address range of a volume for the each address range.

7. A computer system comprising:
a first device comprising:
  a first volatile storage device that stores a rule management program and a key management program; and
  a first processor configured to execute the rule management program and key management program to set predetermined rules and encryption keys to a second device via a network; and
the second device comprising:
  a second processor;
  a second volatile storage device that stores a program to be executed by the second processor; and
  a plurality of nonvolatile storage devices that store data, wherein
  each of the plurality of nonvolatile storage devices holds encryption keys for encrypting and decrypting data set according to the key management program, the encryption keys held at each of the plurality of nonvolatile storage devices comprises at least a first encryption key for encrypting and decrypting first data, and
  each nonvolatile storage device in the plurality of nonvolatile storage devices holds predetermined rules for determining a state of data at a time of transfer set according to the rule management program, each nonvolatile storage device in the plurality of nonvolatile storage devices transfers the first data to another nonvolatile storage device in the plurality of nonvolatile storage devices in an encrypted or unencrypted state, the encrypted or unencrypted state determined according to the predetermined rules, wherein
the processor executes hierarchical control based on an I/O frequency of data stored in a volume,
each of the plurality of nonvolatile storage devices belongs to a separate layer of a plurality of layers based on the I/O frequency of data, and
the first data is transferred between the plurality of nonvolatile storage devices by the hierarchical control.

8. The computer system according to claim 7, wherein the second processor
stops data transfer by the hierarchical control before starting change of an encryption key in the plurality of nonvolatile storage devices, and
resumes the data transfer by the hierarchical control after change of the encryption key in all the nonvolatile storage devices in which the encryption key is changed.

* * * * *